US011295690B2

(12) United States Patent
Yun et al.

(10) Patent No.: US 11,295,690 B2
(45) Date of Patent: Apr. 5, 2022

(54) DISPLAY DEVICE TO IMPROVE DISPLAY QUALITY WHILE MINIMIZING BEZEL AREA

(71) Applicant: Samsung Display Co., Ltd., Yongin-Si (KR)

(72) Inventors: Huigyeong Yun, Hwaseong-si (KR); Junghwan Hwang, Seongnam-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/088,182

(22) Filed: Nov. 3, 2020

(65) Prior Publication Data

US 2021/0256926 A1    Aug. 19, 2021

(30) Foreign Application Priority Data

Feb. 18, 2020    (KR) .................. 10-2020-0019499

(51) Int. Cl.
  *G09G 3/36*     (2006.01)
  *G02F 1/1362*   (2006.01)
  *G02F 1/133*    (2006.01)
  *G02F 1/1343*   (2006.01)

(52) U.S. Cl.
  CPC ....... *G09G 3/3677* (2013.01); *G02F 1/13306* (2013.01); *G02F 1/134309* (2013.01); *G02F 1/136286* (2013.01); *G09G 3/3614* (2013.01); *G09G 3/3688* (2013.01); *G02F 2201/121* (2013.01); *G09G 2300/0426* (2013.01); *G09G 2310/0202* (2013.01); *G09G 2310/0278* (2013.01); *G09G 2320/02* (2013.01)

(58) Field of Classification Search
  CPC .............. G09G 2300/04–0465; G09G 3/3677; G09G 3/3614; G09G 3/3688; G09G 2300/0426; G09G 2310/0202; G09G 2310/0278; G02F 1/13306; G02F 1/134309; G02F 1/136286
  See application file for complete search history.

(56) References Cited

U.S. PATENT DOCUMENTS

| 8,537,104 B2 | 9/2013 | Markvoort et al. |
| 9,991,296 B2 | 6/2018 | Cho et al. |
| 10,340,297 B2 | 7/2019 | Kim et al. |
| 2003/0197668 A1* | 10/2003 | Song .................. G09G 3/3607 345/87 |

(Continued)

FOREIGN PATENT DOCUMENTS

| KR | 10-2008-0050081 A | 6/2008 |
| KR | 10-2015-0030087 A | 3/2015 |

(Continued)

*Primary Examiner* — Roy P Rabindranath
(74) *Attorney, Agent, or Firm* — Innovation Counsel LLP

(57) ABSTRACT

The present disclosure provides a display device. The display device includes a display panel including each of gate lines extending in a first direction, each of sub-gate lines which extends in a second direction crossing the first direction and is electrically connected to the gate line, each of first data lines, each of second data lines, each of first pixels, and each of second pixels, and a driving circuit for providing a gate signal and data signals, wherein a second capacitance between a second drain electrode and a second gate electrode of the second pixel is greater than a first capacitance between a first drain electrode and a first gate electrode of the first pixel.

20 Claims, 12 Drawing Sheets

(56) References Cited

U.S. PATENT DOCUMENTS

| | | | | |
|---|---|---|---|---|
| 2007/0152930 A1* | 7/2007 | Jin | ........................ | G02F 1/1323 |
| | | | | 345/87 |
| 2015/0108480 A1* | 4/2015 | Xu | .......................... | H01L 22/22 |
| | | | | 257/59 |
| 2015/0235599 A1* | 8/2015 | Cho | .................. | H01L 29/42384 |
| | | | | 345/206 |
| 2015/0325197 A1* | 11/2015 | Hong | .................... | G09G 3/3688 |
| | | | | 345/205 |
| 2017/0061837 A1* | 3/2017 | Tang | ........................ | G09G 3/00 |
| 2017/0301702 A1* | 10/2017 | Kim | ..................... | G09G 3/3688 |

FOREIGN PATENT DOCUMENTS

| | | |
|---|---|---|
| KR | 10-1519609 B1 | 5/2015 |
| KR | 10-2015-0097857 A | 8/2015 |
| KR | 10-2017-0118997 A | 10/2017 |

\* cited by examiner

DISPLAY DEVICE TO IMPROVE DISPLAY QUALITY WHILE MINIMIZING BEZEL AREA

CROSS-REFERENCE TO RELATED APPLICATION

This application claims priority to Korean Patent Application No. 10-2020-0019499, filed on Feb. 18, 2020, and all the benefits accruing therefrom under 35 U.S.C. § 119, the content of which in its entirety is herein incorporated by reference.

BACKGROUND

1. Field

Generally, the present disclosure relates to a display device. More particularly, the present disclosure relates to a display device which is capable of improving display quality while minimizing a bezel area on the edge of a display panel.

2. Description of Related Art

A liquid crystal display device is constituted of two display substrates on which a pixel electrode, a common electrode, and the like are formed, and a liquid crystal layer interposed therebetween. When a voltage is applied to the pixel electrode and the common electrode, an electric field is generated between the pixel electrode and the common electrode. As a result, the alignment of liquid crystal molecules of the liquid crystal layer is determined, and the polarization of incident light is controlled, and thus an image may be displayed.

A display panel of the liquid crystal display device includes gate lines, data lines, and pixels. Each of the pixels may include a switching transistor, a liquid crystal capacitor, and a storage capacitor. The pixels may display an image by providing the data lines with corresponding ones of data voltages corresponding to the image after a gate signal is applied through each of the gate lines.

Recently, various efforts are being made to minimize a bezel area on the edge of the display panel. Meanwhile, a quality issue has been consistently raised regarding the non-uniformity of a displayed image as the size of the display panel increases.

SUMMARY

Example embodiments of the present disclosure provide a display device capable of improving display quality while minimizing a bezel area on the edge of a display panel.

An example embodiment of the present disclosure provides a display device comprising: a display panel including gate lines each of which is extending in a first direction, sub-gate lines each of which is extending in a second direction substantially perpendicular to the first direction and electrically connected to the gate line, first data lines each of which is extending in the first direction, second data lines each of which is extending in the first direction, first pixels each of which is connected to the sub-gate line and the first data line, and second pixels each of which is connected to the sub-gate line and the second data line; and a driving circuit configured to provide a gate signal to the gate line and provide data signals to the first data line and the second data line. The first pixel may include a first source electrode connected to the first data line, a first drain electrode connected to a common electrode, and a first gate electrode connected to the sub-gate line, the second pixel may include a second source electrode connected to the second data line, a second drain electrode connected to a common electrode, and a second gate electrode connected to the sub-gate line, and a second capacitance disposed between the second drain electrode and the second gate electrode of the second pixel may be greater than a first capacitance disposed between the first drain electrode and the first gate electrode of the first pixel.

In an embodiment, a surface area of an overlapped area between the second drain electrode and the second gate electrode of the second pixel may be greater than a surface area of an overlapped area between the first drain electrode and the first gate electrode of the first pixel.

In an embodiment, the second drain electrode of the second pixel may include a main drain electrode disposed to be spaced apart from the second source electrode and a sub-drain electrode protruding outwardly from the main drain electrode along the first direction, the second gate electrode of the second pixel may include a main gate electrode overlapping the second source electrode and the main drain electrode, and a sub-gate electrode protruding outwardly from the main gate electrode along the second direction, and a portion of the sub-drain electrode and a portion of the sub-gate electrode may overlap each other to form a rectangular overlapped area when viewed in a plane.

In an embodiment, the sub-drain electrode may not overlap the main gate electrode.

In an embodiment, the sub-gate electrode may not overlap the main drain electrode.

In an embodiment, a number of the gate lines may be equal to a number of the data lines.

In an embodiment, the first pixel and the second pixel may be disposed adjacent to each other in the second direction, the first pixel may be disposed adjacent to the gate line, and the second pixel may be spaced apart from the gate line with the first pixel interposed between the second gate pixel and the gate line.

In an embodiment, a number of the data lines may be greater than a number of the gate lines.

In an embodiment, the driving circuit may include a flexible circuit board connected to one side of the display panel, and a driving chip mounted on the flexible circuit board and configured to provide the gate signal and each of the data signals.

In an embodiment of the present disclosure, a display device comprises: a display panel including a plurality of gate lines extending in a first direction, a plurality of sub-gate lines extending in a second direction substantially perpendicular to the first direction and electrically connected to the plurality of gate lines, respectively, a plurality of data lines extending in the first direction, and a plurality of first pixels and a plurality of second pixels which are each connected to a corresponding sub-gate line of the plurality of sub-gate lines and a corresponding data line of the plurality of data lines; and a driving circuit configured to provide a plurality of gate signals to the plurality of gate lines, respectively, and provide a plurality of data signals to the plurality of data lines, respectively. First pixels, which correspond to an i-th sub-gate line among the plurality of sub-gate lines, among the plurality of first pixels may be connected to the i-th sub-gate line, and disposed adjacent to from i-th to (i+k)-th (i and k are each a natural number) gate lines among the plurality of gate lines, each of the plurality of first pixels may include a first source electrode connected to a corresponding data line among the data lines, a first drain electrode connected to a common electrode, and a first gate electrode connected to a corresponding sub-gate line among the sub-gate lines, each of the second pixels may include a second source electrode connected to a corresponding data line among the data lines, a second drain electrode connected to a common electrode, and a second gate electrode connected to a corresponding sub-gate line among the sub-gate lines, and a second capacitance disposed between the second drain electrode and the second gate electrode of each of the plurality of second pixels may be greater than a first capacitance disposed between the first drain electrode and the first gate electrode of each of the plurality of first pixels.

In an embodiment, a surface area of an overlapped area between the second drain electrode and the second gate electrode of each of the plurality of second pixels may be greater than a surface area of an overlapped area between the first drain electrode and the first gate electrode of each of the first pixels.

In an embodiment, the second drain electrode of each of the plurality of second pixels may include a main drain electrode disposed to be spaced apart from the second source electrode and a sub-drain electrode protruding outwardly from the main drain electrode along the first direction, the second gate electrode of the second pixel may include a main gate electrode overlapping the second source electrode and the main drain electrode, and a sub-gate electrode protruding outwardly from the main gate electrode along the second direction, and a portion of the sub-drain electrode and a portion of the sub-gate electrode may overlap each other to form a rectangular overlapped area when viewed in a plane.

In an embodiment, the sub-drain electrode may not overlap the main gate electrode.

In an embodiment, the sub-gate electrode may not overlap the main drain electrode.

In an embodiment, the plurality of gate signals respectively provided to the plurality of gate lines may be sequentially activated at an active level every horizontal period, and may respectively be maintained at the active level for (k+1) number of horizontal periods.

In an embodiment, odd-numbered data lines among the plurality of data lines may be respectively disposed on left sides of pixel columns formed by the plurality of first pixels and the plurality of second pixels, even-numbered data lines among the plurality of data lines may be respectively disposed on right sides of the pixel columns formed by the plurality of first pixels and the plurality of second pixels, and each of the plurality of first pixels and the plurality of second pixels may be connected to any one of the odd-numbered data lines and the even-numbered data lines.

In an embodiment, the odd-numbered data lines among the plurality of data lines may alternately transmit data signals of positive polarity and data signals of negative polarity every frame, and the even-numbered data lines among the plurality of data lines may alternately transmit data signals of the negative polarity and data signals of the positive polarity every frame.

In an embodiment, first pixels and second pixels arranged in the same column in the first direction may be alternately connected to a corresponding one, disposed on the left of the first pixels and the second pixels, of the odd-numbered data lines and a corresponding one, disposed on the right thereof, of the even-numbered data lines.

In an embodiment, the driving circuit may include a flexible circuit board connected to one side of the display panel, and a driving chip mounted on the flexible circuit board and configured to provide the plurality of gate signals and the plurality of data signals.

In an embodiment, the display panel may further include a first substrate, a second substrate facing the first substrate, and a liquid crystal layer disposed between the first substrate and the second substrate, wherein the plurality of gate lines, the plurality of sub-gate lines, the plurality of data lines, the plurality of first pixels, and the plurality of second pixels are arranged on the first substrate.

BRIEF DESCRIPTION OF THE FIGURES

The accompanying drawings are included to provide a further understanding of the present disclosure, and are incorporated in and constitute a part of this specification. The drawings illustrate example embodiments of the present disclosure and, together with the description, serve to describe principles of the present disclosure. In the drawings.

DETAILED DESCRIPTION

Figure 1:
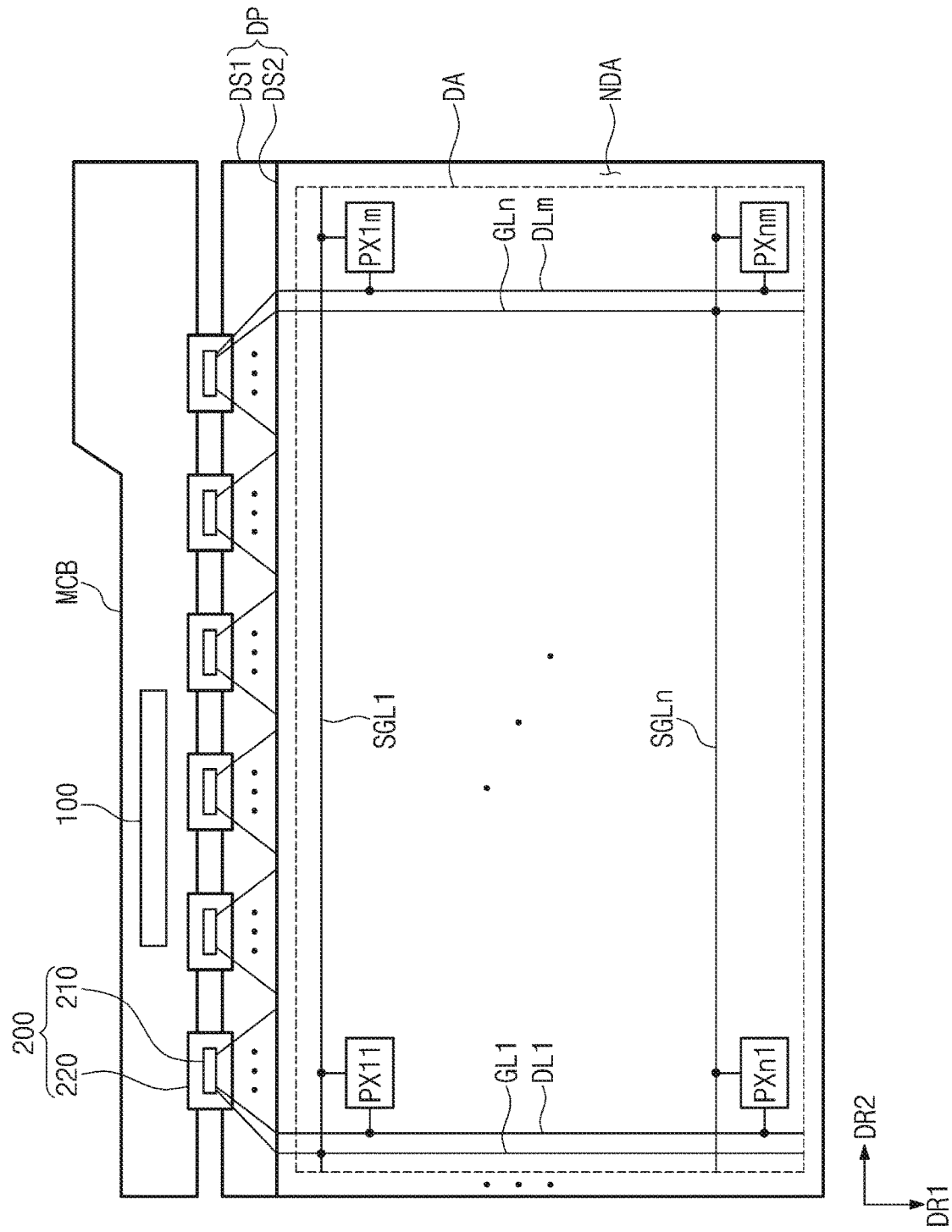
FIG. 1 is a plan view illustrating an example embodiment of a display device according to an embodiment of the present disclosure.

It will be understood that when an element or layer is referred to as being "on", "connected to" or "coupled to" another element or layer, it can be directly on, connected or coupled to the other element or layer, or intervening elements or layers may be present.

Like reference numerals refer to like elements throughout this specification. In the figures, the thicknesses, ratios and dimensions of elements are exaggerated for effective description of the technical contents. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will be further understood that the terms "include" or "have", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure are described in more detail with reference to the accompanying drawings.

FIG. 1 is a plan view of a display device according to an embodiment of the present disclosure.

As illustrated in FIG. 1, the display device according to an embodiment of the present disclosure includes a display panel DP, a main circuit board MCB, a driving controller 100, and a driving circuit 200.

The display panel DP is not particularly limited and may include various types of display panels, for example, a liquid crystal display panel, an organic light emitting display panel, an electrophoretic display panel, and an electrowetting display panel. In this example embodiment, the display panel DP is described as a liquid crystal display panel. Meanwhile, a liquid crystal display device including the liquid crystal display panel may further include a polarizer, a backlight unit, and the like, which are not illustrated.

The display panel DP includes a first substrate DS1, a second substrate DS2 spaced apart from the first substrate DS1, and a liquid crystal layer LCL (see FIG. 3) disposed between the first substrate DS1 and the second substrate DS2. When viewed in a plane, the display panel DP includes a display area DA in which a plurality of pixels from PX11 to PXnm are arranged and a non-display area NDA surrounding the display area DA.

The display panel DP includes gate lines from GL1 to GLn, sub-gate lines from SGL1 to SGLn, data lines from DL1 to DLm, and the pixels from PX11 to PXnm, which are disposed on the first substrate DS1.

The gate lines from GL1 to GLn extend in a first direction DR1 and are sequentially arranged in a second direction DR2. The sub-gate lines SGL1 from to SGLn extend in the second direction DR2 and are sequentially arranged in the first direction DR1. The first direction DR1 and the second direction DR2 cross each other. In an example embodiment, the first direction DR1 may be orthogonal to the second direction DR2. The data lines from DL1 to DLm extend in the first direction DR1 and are sequentially arranged in the second direction DR2. Each of the sub-gate lines from SGL1 to SGLn is electrically connected to a corresponding gate line among the gate lines from GL1 to GLn.

The data lines from DL1 to DLm may be parallel to the gate lines from GL1 to GLn and may cross the sub-gate lines from SGL1 to SGLn.

In an example embodiment, the number of the gate lines from GL1 to GLn may be equal to the number of the data lines from DL1 to DLm. In another embodiment, the number of data lines from DL1 to DLm may be greater than the number of gate lines from GL1 to GLn. When the number of the gate lines from GL1 to GLn is equal to the number of the data lines from DL1 to DLm, the data lines from DL1 to DLm and the gate lines from GL1 to GLn may be alternately arranged, one data line and one gate line at a time, in the second direction DR2. When the number of the data lines from DL1 to DLm is greater than the number of the gate lines from GL1 to GLn, the data lines from DL1 to DLm and the gate lines from GL1 to GLn may be alternately arranged, x (x is a positive integer) number of data lines and one gate line at a time, in the second direction DR2.

FIG. 1 illustrates only some of the plurality of pixels from PX11 to PXnm. Each of the pixels from PX11 to PXnm is connected to a corresponding sub-gate line of the sub-gate lines from SGL1 to SGLn and a corresponding data line of the data lines from DL1 to DLm.

The plurality of pixels from PX11 to PXnm may be classified into a plurality of groups according to a color displayed by the plurality of pixels from PX11 to PXnm. The plurality of pixels from PX11 to PXnm may display one of primary colors. The primary colors may include red, green, blue, and white. An embodiment of the present disclosure is not limited. For example, the primary colors may further include various colors such as yellow, cyan, and magenta.

The driving circuit 200 receives a control signal from the driving controller 100. The driving controller 100 may be mounted on the main circuit board MCB. The driving controller 100 receives image data and the control signal from an external graphic controller (not shown). The driving circuit 200 generates gate signals from G1 to Gn (see FIG. 5) on the basis of the control signal received from the driving controller 100, and outputs the gate signals from G1 to Gn to the gate lines from GL1 to GLn. The driving circuit 200 may sequentially output gate signals from G1 to Gn at an active level (e.g., a high level) every horizontal period 1H. For example, each of the gate signals from G1 to Gn may be maintained at the active level (e.g., the high level) for four horizontal periods 4H.

In addition, the driving circuit 200 generates data signals according to the image data provided from the driving controller 100, on the basis of the control signal received from the driving controller 100. The driving circuit 200 outputs the data signals to the data lines from DL1 to DLm. The data signals may include data signals of positive polarity having a positive value and/or data signals of negative polarity having a negative value, in relation to a common voltage. During each horizontal period 1H, some of the data signals applied to the data lines from DL1 to DLm may have positive polarity, and the rest thereof may have negative polarity. The polarity of the data signals may be inverted every frame in order to prevent the degradation of liquid crystal.

The driving circuit 200 may include a driving chip 210 and a flexible circuit board 220 on which the driving chip 210 is mounted. The driving chip 210 and the flexible circuit board 220 may each be provided in plurality. The display device may include a driving circuit 200 comprised of the plurality of driving chips 210 and the plurality of flexible circuit boards 220. The flexible circuit board 220 electrically connects the main circuit board MCB and the first substrate DS1. Each of the plurality of driving chips 210 provides corresponding gate signals to corresponding gate lines among the gate lines from GL1 to GLn, and corresponding data signals to corresponding data lines among the data lines from DL1 to DLm.

One driving chip 210 is illustrated and described as generating both the gate signals and the data signals in FIG. 1, but an embodiment of the present disclosure is not limited. For example, a gate driving chip generating the gate signals and a data driving chip generating the data signals may be implemented as separate chips and mounted on one flexible circuit board 220.

The driving chips 210 may be electrically connected to one end of the first substrate DS1 in a chip on film (COF) method, as illustrated in FIG. 1. In another embodiment, driving chips 210 may be disposed directly in a non-display area NDA of a display panel DP in a chip on glass (COG) method.

The flexible circuit board 220 is excellent in bending resistance. Accordingly, one portion of the flexible circuit board 220 which is connected to the display panel DP may be bent and disposed on a rear surface of the display panel DP together with the main circuit board MCB. Because no driving circuit and/or driving chips are disposed in and/or connected to a portion of the non-display area NDA adjacent in the second direction DR2 and to a portion of the display area DA of the display panel DP, the surface area of the non-display area NDA may be minimized.

Figure 2:
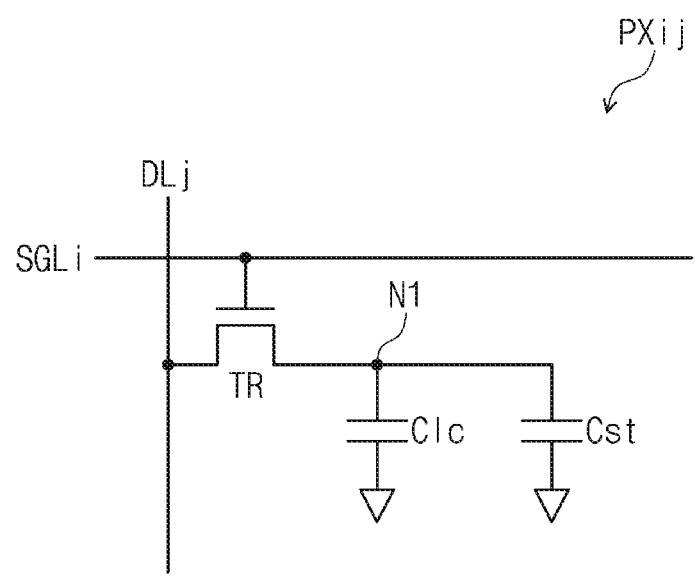
FIG. 2 is an equivalent circuit diagram of a pixel according to an embodiment of the present disclosure.
Figure 3:
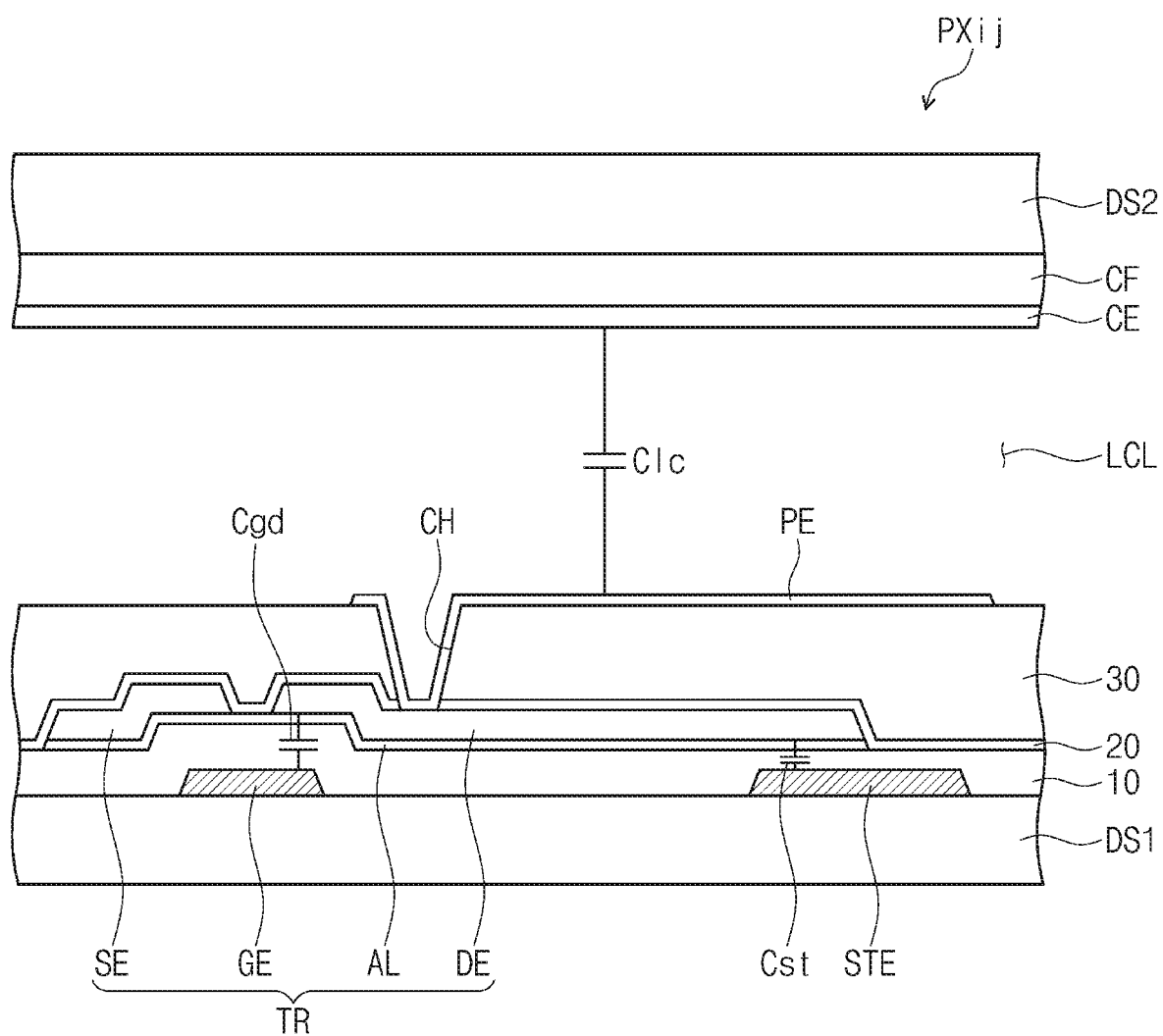
FIG. 3 is a cross-sectional view of a pixel according to an embodiment of the present disclosure.

FIG. 2 is an equivalent circuit diagram of a pixel, of the pixels, according to an embodiment of the present disclosure. FIG. 3 is a cross-sectional view of the pixel according to an embodiment of the present disclosure. Each of the pixels from PX11 to PXnm illustrated in FIG. 1 may have the equivalent circuit illustrated in FIG. 2.

As illustrated in FIG. 2, a pixel PXij includes a pixel thin film transistor TR (hereinafter referred to as a pixel transistor TR), a liquid crystal capacitor Clc, and a storage capacitor Cst. Hereinafter, a transistor means a thin film transistor. In an embodiment of the present disclosure, the storage capacitor Cst may be omitted.

The pixel transistor TR is electrically connected to an i-th sub-gate line SGLi and a j-th data line DLj. The pixel transistor TR transmits, to the liquid crystal capacitor Clc, a data signal received from the j-th data line DLj in response to a gate signal received from the i-th sub-gate line SGLi.

The liquid crystal capacitor Clc is charged to a voltage corresponding to the data signal transmitted from the pixel transistor TR. The alignment of a director of liquid crystal included in the liquid crystal layer LCL (see FIG. 3) is changed according to the quantity of electric charge charged in the liquid crystal capacitor Clc. Light incident on the liquid crystal layer is transmitted or blocked according to the alignment of the director of the liquid crystal.

The storage capacitor Cst is connected in parallel to the liquid crystal capacitor Clc. The storage capacitor Cst maintains the alignment of the director of the liquid crystal for a certain period of time (e.g., the horizontal period 1H).

As illustrated in FIG. 3, the pixel transistor TR includes a gate electrode GE connected to the i-th sub-gate line SGLi (see FIG. 2), an active layer AL overlapping the gate electrode GE, a source electrode SE connected to the j-th data line DLj (see FIG. 2), and a drain electrode DE disposed to be spaced apart from the source electrode SE.

The liquid crystal capacitor Clc includes a pixel electrode PE and a common electrode CE. The storage capacitor Cst includes a storage electrode STE.

The i-th sub-gate line SGLi and the storage electrode STE are disposed on one surface of the first substrate DS1. The gate electrode GE is branched from the i-th sub-gate line SGLi. The i-th sub-gate line SGLi and a storage electrode STE may include a metal such as aluminum (Al), silver (Ag), copper (Cu), molybdenum (Mo), chromium (Cr), tantalum (Ta), and titanium (Ti), or an alloy of the above. The i-th sub-gate line SGLi and the storage electrode STE may include a multilayer structure, for example, a titanium layer and a copper layer.

A first insulating layer 10 covering the gate electrode GE and the storage electrode STE is disposed on the one surface of the first substrate DS1. The first insulating layer 10 may include at least one of an inorganic material or an organic material. The first insulating layer 10 may be an organic film or an inorganic film. The first insulating layer 10 may include a multilayer structure, for example, a silicon nitride layer and a silicon oxide layer.

The active layer AL overlapping the gate electrode GE is disposed on the first insulating layer 10. The active layer AL may include a semiconductor layer and an ohmic contact layer. The semiconductor layer is disposed on the first insulating layer 10, and the ohmic contact layer is disposed on the semiconductor layer.

The drain electrode DE and the source electrode SE are disposed on the active layer AL. The drain electrode DE and the source electrode SE are disposed to be spaced apart from each other. Each of the drain electrode DE and the source electrode SE partially overlaps the gate electrode GE.

A second insulating layer 20 covering the active layer AL, the drain electrode DE, and the source electrode SE is disposed on the first insulating layer 10. The second insulating layer 20 may include at least one of an inorganic material or an organic material. The second insulating layer 20 may be an organic film or an inorganic film. The second insulating layer 20 may include a multilayer structure, for example, a silicon nitride layer and a silicon oxide layer.

A third insulating layer 30 is disposed on the second insulating layer 20. The third insulating layer 30 provides a flat surface. The third insulating layer 30 may include an organic material.

The pixel electrode PE is disposed on the third insulating layer 30. The pixel electrode PE is connected to the drain electrode DE through a contact hole CH penetrating the second insulating layer 20 and the third insulating layer 30. An alignment film (not shown) covering the pixel electrode PE may be disposed on the third insulating layer 30.

A color filter layer CF is disposed on one surface of the second substrate DS2. The common electrode CE is disposed on the color filter layer CF. The common voltage is applied to the common electrode CE. An alignment film (not shown) covering the common electrode CE may be disposed on the common electrode CE. Another insulating layer may be disposed between the color filter layer CF and the common electrode CE.

The liquid crystal layer LCL is interposed between the pixel electrode PE and the common electrode CE and forms the liquid crystal capacitor Clc together with the pixel electrode PE and the common electrode CE. In addition, the first insulating layer 10 is interposed between the drain electrode DE and the storage electrode STE and form the storage capacitor Cst together with the drain electrode DE and the storage electrode STE. The storage electrode STE receives a storage voltage. The storage voltage may have the same voltage as the common voltage provided to the common electrode CE.

Meanwhile, the cross section of the pixel PXij illustrated in FIG. 3 is only an example. Unlike in FIG. 3, at least one of the color filter layer CF or the common electrode CE may be disposed on the first substrate DS1. In other words, the liquid crystal display panel according to this embodiment may include pixels of a mode such as a vertical alignment (VA) mode, a patterned vertical alignment (PVA) mode, an in-plane switching (IPS) mode, a fringe-field switching (FFS) mode, and a plane to line switching (PLS) mode.

Figure 4:
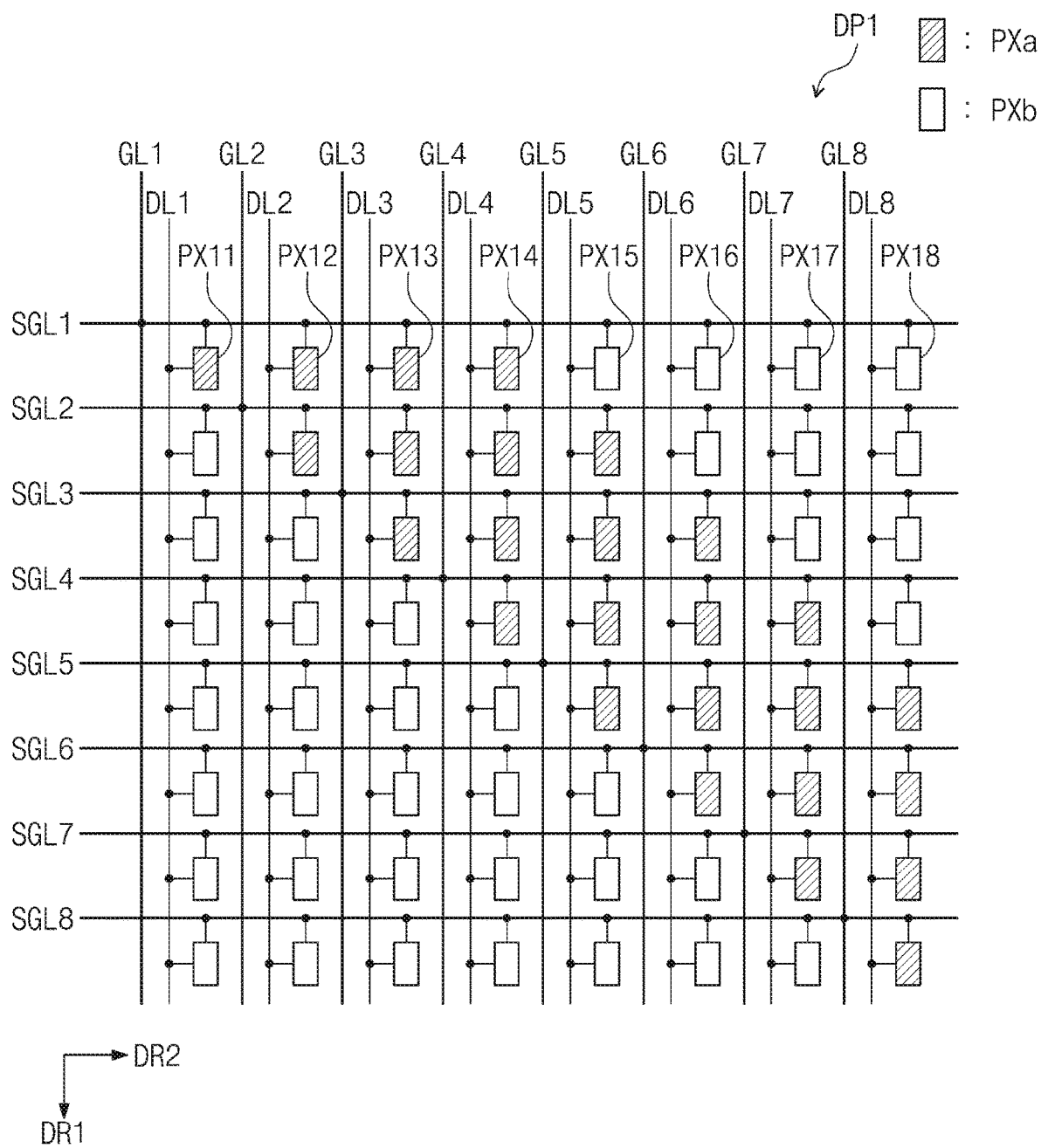
FIG. 4 illustrates a pixel arrangement of a display panel according to an example embodiment of the present disclosure.

FIG. 4 illustrates a pixel arrangement of a display panel DP1 according to an example embodiment of the present disclosure.

Referring to FIG. 4, the display panel DP1 includes gate lines from GL1 to GL8, sub-gate lines from SGL1 to SGL8, data lines from DL1 to DL8, first pixels PXa, and second pixels PXb. The gate lines from GL1 to GL8 extend in the first direction DR1 and are sequentially arranged in the second direction DR2. The sub-gate lines from SGL1 to SGL8 extend in the second direction DR2 and are sequentially arranged in the first direction DR1. The first direction DR1 and the second direction DR2 cross each other. In an example embodiment, the first direction DR1 and the second direction DR2 may be perpendicular to each other. The data lines from DL1 to DL8 extend in the first direction DR1 and are sequentially arranged in the second direction DR2. Each of the sub-gate lines from SGL1 to SGL8 is electrically connected to a corresponding gate line among the gate lines from GL1 to GL8. Each of the gate lines from GL1 to GL8 may be respectively disposed adjacent to each of the data lines from DL1 to DL8.

Each of the first pixels PXa and the second pixels PXb may include the pixel transistor TR, the liquid crystal capacitor Clc, and the storage capacitor Cst, as illustrated in FIG. 2. Each of the first pixels PXa and the second pixels PXb is connected to a corresponding sub-gate line among the sub-gate lines from SGL1 to SGL8 and a corresponding data line among the data lines from DL1 to DL8. The gate signals provided through the gate lines from GL1 to GL8 may be transmitted to the first pixels PXa and the second pixels PXb through the sub-gate lines from SGL1 to SGL8 respectively.

First pixels PXa and/or second pixels PXb arranged in the same row in the second direction DR2 are connected to the same sub-gate line. First pixels PXa and/or second pixels PXb arranged in the same column in the first direction DR1 are connected to the same data line.

Figure 5:
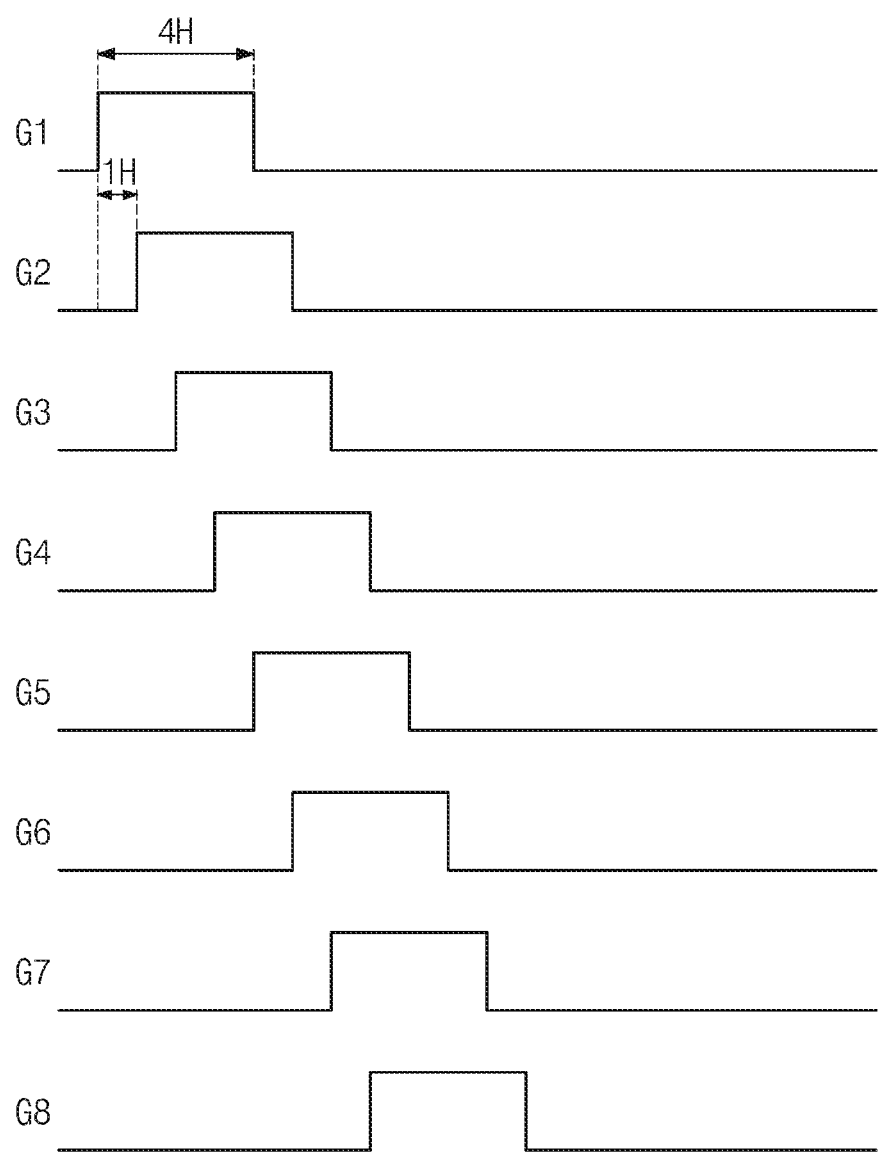
FIG. 5 illustrates gate signals provided to the gate lines illustrated in FIG. 4.

FIG. 5 illustrates the gate signals from G1 to G8 respectively provided to the gate lines from GL1 to GL8 illustrated in FIG. 4.

Referring to FIG. 5, the gate signals from G1 to G8 sequentially transition to the active level (e.g., the high level). The gate signals from G1 to G8 are signals provided from the driving chip 210 illustrated in FIG. 1. The gate signals from G1 to G8 may be sequentially activated every horizontal period 1H. Each of the gate signals from G1 to G8 may be maintained at the active level for the four horizontal periods 4H. The horizontal period 1H may refer to a period of time for which data signals are respectively provided to all of first pixels PXa and/or second pixels PXb in one row of the second direction DR2 illustrated in FIG. 4.

Figure 6:
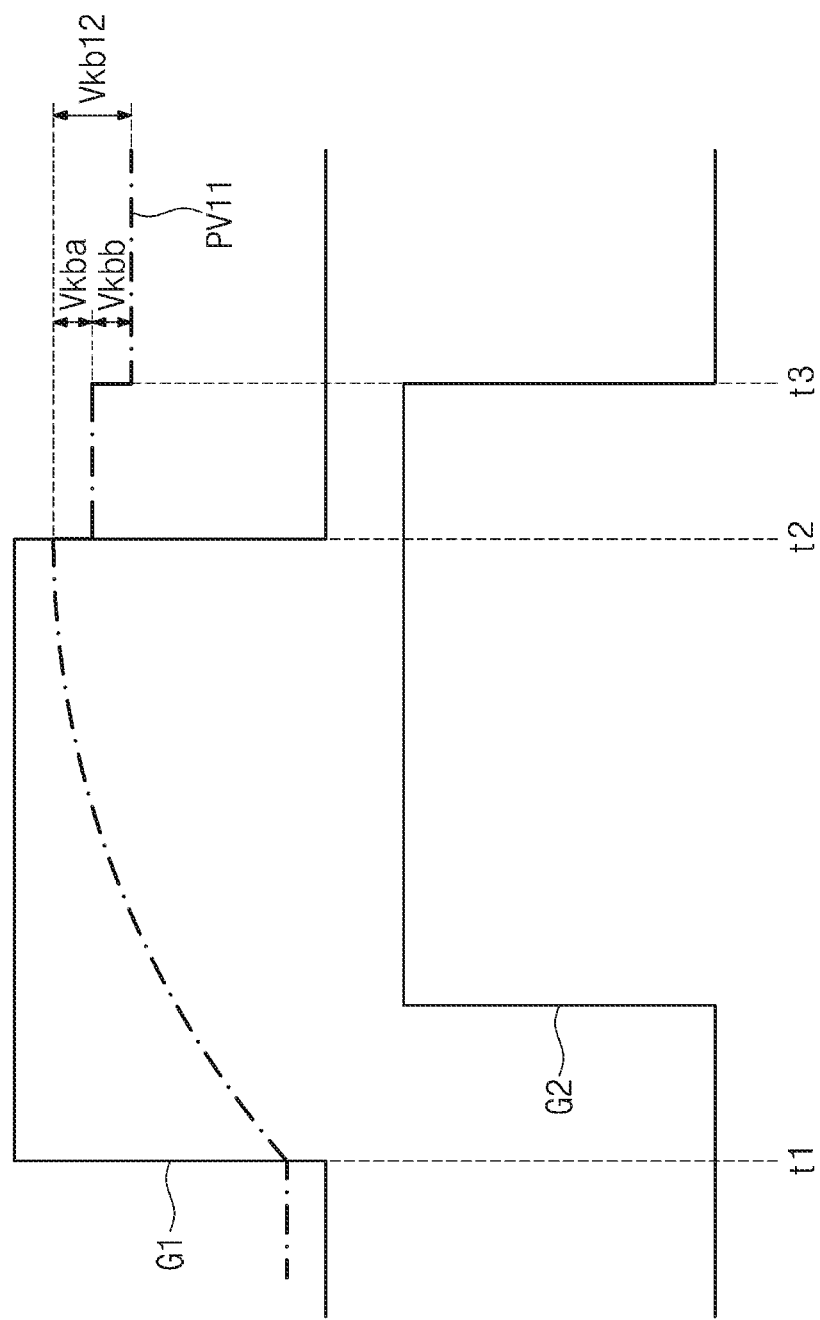
FIG. 6 illustrates a first gate signal provided to a first gate line, a second gate signal provided to a second gate line, and a pixel voltage of the pixel illustrated in FIG. 4.

FIG. 6 illustrates a first gate signal G1 provided to a first gate line GL1, a second gate signal G2 provided to a second gate line GL2, and a pixel voltage PV11 of the pixel PX11 illustrated in FIG. 4. The pixel voltage PV11 of the pixel PX11 is a voltage at a node N1 of the pixel PXij illustrated in FIG. 2.

Referring to FIGS. 2, 4, 5 and 6, when the first gate signal G1 transitions to the high level at a first timing t1, the pixel transistor TR of the pixel PX11 is turned on, and the pixel voltage PV11 of the pixel PX11 increases by a data signal provided through a first data line DL1. In an ideal case, the pixel voltage PV11 provided to the pixel electrode PE of the liquid crystal capacitor Clc and the storage capacitor Cst should be maintained at a constant level for one frame.

However, when the first gate signal G1 transitions to a low level at a second timing t2, the pixel voltage PV11 decreases by a kickback voltage Vkba due to a parasitic capacitance Cgd between the gate electrode GE and the drain electrode DE.

Subsequently, when the second gate signal G2 transitions to the low level at a third timing t3, the pixel voltage PV11 of the pixel PX11 may decrease by a kickback voltage Vkbb. This is due to a fringe field generated by the adjacency of the pixel PX11 and the second gate line GL2. As a result, the pixel voltage PV11 of the pixel PX11 decreases by a voltage Vkb12 which is the sum of the kickback voltages Vkba and Vkbb.

Figure 7:
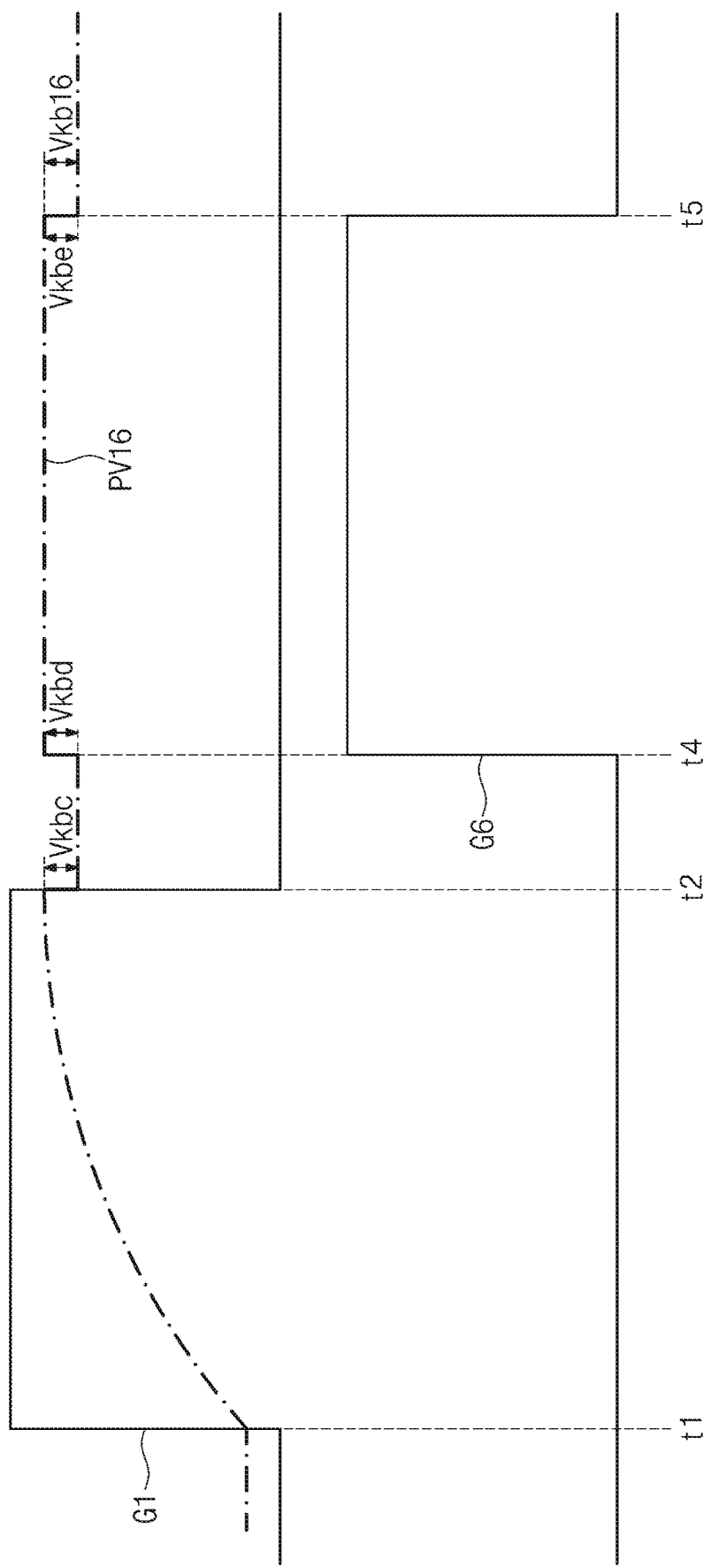
FIG. 7 illustrates the first gate signal provided to the first gate line, a sixth gate signal provided to a sixth gate line, and a pixel voltage of the pixel illustrated in FIG. 4.

FIG. 7 illustrates the first gate signal G1 provided to the first gate line GL1, a sixth gate signal G6 provided to a sixth gate line GL6, and a pixel voltage PV16 of the pixel PX16 illustrated in FIG. 4. The pixel voltage PV16 of the pixel PX16 is a voltage at the node N1 of the pixel PXij illustrated in FIG. 2.

Referring to FIGS. 2, 4, 5 and 7, when the first gate signal G1 transitions to the high level at the first timing t1, the pixel transistor TR of the pixel PX16 is turned on, and the pixel voltage PV16 of the pixel PX16 increases by a data signal provided through a sixth data line DL6.

When the first gate signal G1 transitions to the low level at the second timing t2, the pixel voltage PV16 decreases by a kickback voltage Vkbc due to the parasitic capacitance Cgd between the gate electrode GE and the drain electrode DE.

Subsequently, when the sixth gate signal G6 transitions to the high level at a fourth timing t4, the pixel voltage PV16 of the pixel PX16 increases by a kickback voltage Vkbd. In addition, when the sixth gate signal G6 transitions to the low level at a fifth timing t5, the pixel voltage PV16 of the pixel PX16 decreases by a kickback voltage Vkbe. That is, a kickback voltage Vkb16 of the pixel voltage PV16 of the pixel PX16 decreases by the kickback voltage Vkbc, then increases by the kickback voltage Vkbd, and then decreases by the kickback voltage Vkbe. Assuming that Vkbd is equal to Vkbe, the kickback voltage Vkb16 of the pixel voltage PV16 of the pixel PX16 is substantially the same as the kickback voltage Vkbc.

The kickback voltage Vkb12 of the pixel PX11 illustrated in FIG. 6 is greater than the kickback voltage Vkb16 of the pixel PX16 illustrated in FIG. 7. In an example illustrated in FIG. 5, when the gate signals from G1 to G8 are sequentially activated every horizontal period 1H and each of the gate signals from G1 to G8 is maintained at the active level for the four horizontal periods 4H, kickback voltages of first pixels PXa from the first pixel PXa disposed in an i-th column of an i-th row to the first pixels PXa disposed adjacent to an (i+3)-th gate line in the i-th row, are greater than kickback voltages of pixels adjacent to other gate lines in the i-th row, that is, second pixels PXb in the i-th row. For example, the kickback voltage of each of the four pixels from PX11 to PX14 (i.e., first pixels PXa) connected to a first sub-gate line SGL1 of a first row is greater than the kickback voltage of each of the pixels from PX15 to PX18 (i.e., second pixels PXb). In addition, the kickback voltage of each of first pixels PXa connected to a second sub-gate line SGL2 in a second row and respectively connected to from a second data line DL2 to a fifth data line DL5 is greater than the kickback voltage of each of second pixels PXb respectively connected to remaining data lines DL1 and from DL6 to DL8. This difference in kickback voltage may cause non-uniformity of an image displayed on the display panel DP.

In an example embodiment of the present disclosure, a second gate-drain capacitance Cgd2 (not shown) of each of the second pixels PXb (e.g., the pixels from PX15 to PX18) is designed to be larger than a first gate-drain capacitance Cgd1 (not shown) of each of the first pixels PXa (e.g., the pixels from PX11 to PX14). A rise in the second gate-drain capacitance Cgd2 of each of the second pixels PXb increases the kickback voltage of each of the second pixels PXb. Accordingly, the kickback voltage of each of the second pixels PXb becomes the same as the kickback voltage of each of the first pixels PXa. As a result, degradation in display quality due to a difference in kickback voltage between the first pixels PXa and the second pixels PXb may be prevented. A scheme for increasing the second gate-drain capacitance Cgd2 of each of the second pixels PXb will be described in detail later.

Figure 8:
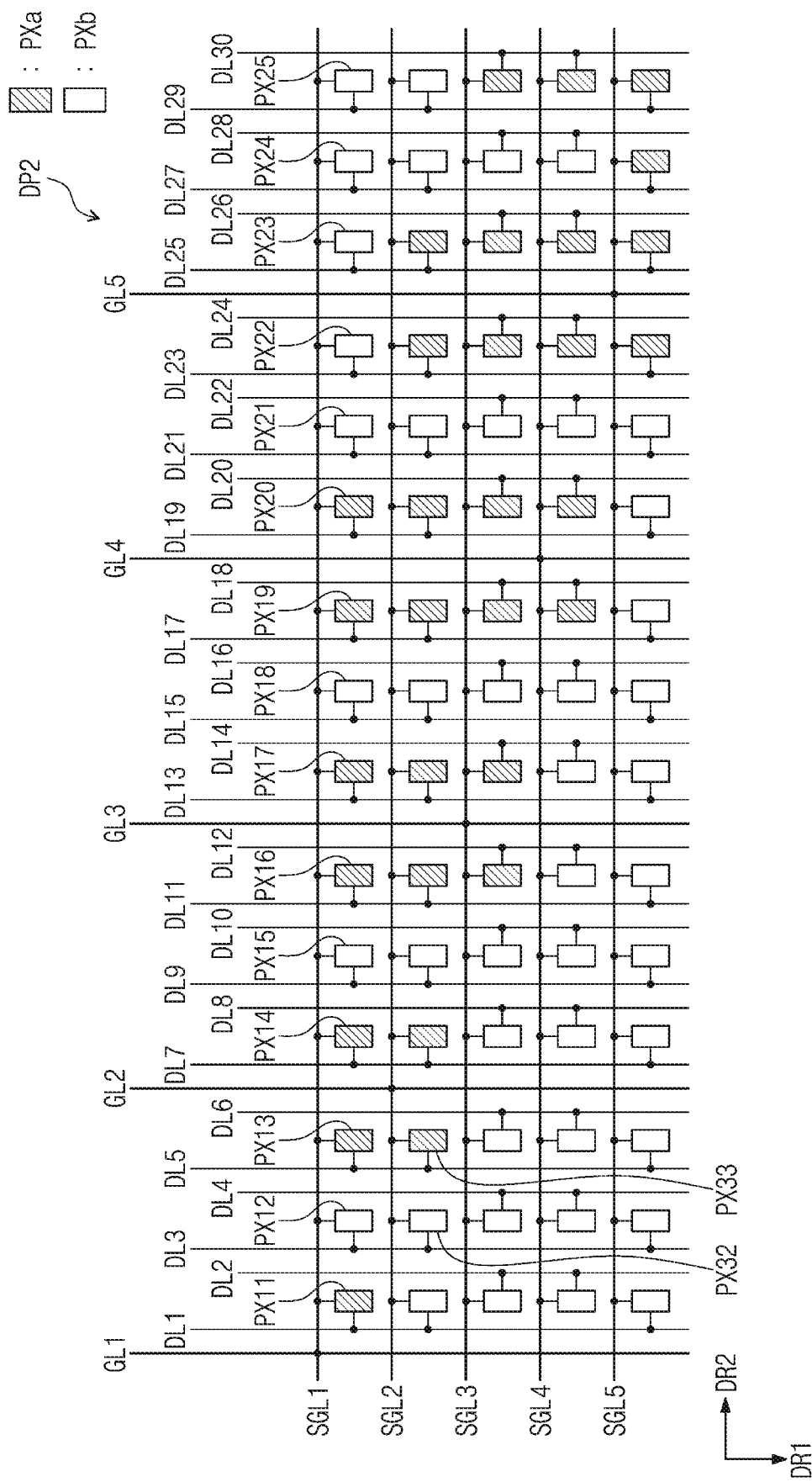
FIG. 8 illustrates a pixel arrangement of a display panel according to an example embodiment of the present disclosure.

FIG. 8 illustrates a pixel arrangement of a display panel DP2 according to an example embodiment of the present disclosure.

Referring to FIG. 8, the display panel DP2 includes gate lines from GL1 to GL5, sub-gate lines from SGL1 to SGL5, data lines from DL1 to DL30, first pixels PXa, and second pixels PXb. The gate lines from GL1 to GL5 extend in the first direction DR1 and are sequentially arranged in the second direction DR2. The sub-gate lines from SGL1 to SGL5 extend in the second direction DR2 and are sequentially arranged in the first direction DR1. The first direction DR1 and the second direction DR2 cross each other. In an example embodiment, the first direction DR1 and the second direction DR2 may be perpendicular to each other. The data lines from DL1 to DL30 extend in the first direction DR1 and are sequentially arranged in the second direction DR2. Each of the sub-gate lines from SGL1 to SGL5 is electrically connected to a corresponding gate line among the gate lines from GL1 to GL5. The gate lines from GL1 to GL5 may be arranged in parallel with the data lines from DL1 to DL30.

In an embodiment illustrated in FIG. 8, the number of the data lines from DL1 to DL30 is greater than the number of the gate lines from GL1 to GL5. Accordingly, one gate line of the gate lines from GL1 to GL5 may be disposed for every six data lines of the data lines from DL1 to DL30. In an example embodiment, the number of the data lines from DL1 to DL30 may be twice the number of first pixels PXa and second pixels PXb arranged in the same row in the second direction DR2. That is, two data lines of the data lines from DL1 to DL30 may be respectively disposed adjacent to left and right sides of a corresponding pixel of first pixels PXa and second pixels PXb arranged in the same row in the second direction DR2.

In an example embodiment, first pixels PXa and second pixels PXb in an i-th row are connected to an i-th sub-gate line SGLi connected to an i-th gate line GLi. The first pixels PXa in the i-th row are pixels connected to the i-th sub-gate line SGLi and disposed adjacent to from the i-th gate line GLi to an (i+k)-th gate line GLi+k (i and k are each a natural number). The second pixels PXb are pixels other than the first pixels PXa. When the gate signals from G1 to G5 respectively provided to the gate lines from GL1 to GL5 are sequentially activated every horizontal period 1H, and each of the gate signals from G1 to G5 is maintained at the active level for the four horizontal periods 4H, k may be equal to 3.

Each of the first pixels PXa and the second pixels PXb may include the pixel transistor TR, the liquid crystal capacitor Clc, and the storage capacitor Cst, as illustrated in FIG. 2. Each of the first pixels PXa and the second pixels PXb is connected to a corresponding sub-gate line among the sub-gate lines from SGL1 to SGL5 and a corresponding data line among the data lines from DL1 to DL30. The gate signals provided through the gate lines from GL1 to GL5 may be transmitted to the first pixels PXa and the second pixels PXb through the sub-gate lines from SGL1 to SGL5 respectively.

First pixels PXa and/or second pixels PXb arranged in the same row in the second direction DR2 are connected to the same sub-gate line. First pixels PXa and/or second pixels PXb arranged in the same column in the first direction DR1 may be alternately connected to a data line adjacent to the left side and a data line adjacent to the right side. In the example illustrated in FIG. 8, first pixels PXa and/or second pixels PXb arranged in the same column in the first direction DR1 are alternately connected to a data line adjacent to the left side and a data line adjacent to the right side, two pixels at a time. In a predetermined frame, for example, odd-numbered data lines from DL1 to DL29 of the data lines from DL1 to DL30 may be driven with data signals of positive polarity, and even-numbered data lines from DL2 to DL30 of the data lines from DL1 to DL30 may be driven with data signals of negative polarity.

Some of the pixels of the display panel DP2 illustrated in FIG. 8 are respectively adjacent to corresponding gate lines of the gate lines from GL1 to GL5 extending in the first direction DR1, and the rest of the pixels are not directly adjacent to the gate lines from GL1 to GL5. That is, any set of pixels which are disposed in the middle of two adjacent pixels are not directly adjacent to the gate lines from GL1 to GL5. The gate signals from G1 to G5 illustrated in FIG. 5 may be respectively provided to the gate lines from GL1 to GL5.

As previously described with reference to FIGS. 6 and 7, when the gate signals from G1 to G5 are sequentially activated every horizontal period 1H and each of the gate signals from G1 to G5 is maintained at the active level for the four horizontal periods 4H, kickback voltages of first pixels PXa disposed adjacent to from an i-th gate line to an (i+3)-th gate line in the i-th row are greater than kickback voltages of second pixels PXb in the i-th row. For example, a kickback voltage of each of the seven pixels PX11, PX13, PX14, PX16, PX17, PX19 and PX20 connected to a first sub-gate line SGL1 of a first row is greater than a kickback voltage of each of the pixels PX12, PX15, PX18, and from PX21 to PX25. Because each of the pixels PX11, PX13, PX14, PX16, PX17, PX19 and PX20 is adjacent to a corresponding one of the gate lines from GL1 to GL4, the kickback voltage of each of the pixels PX11, PX13, PX14, PX16, PX17, PX19 and PX20 may increase due to the effect of a fringe field.

The pixel PX12 disposed between the pixels PX11 and PX13, the pixel PX15 disposed between the pixels PX14 and PX16, and the pixel PX18 disposed between the pixels PX17 and PX19 are not disposed directly adjacent to the corresponding gate lines, and thus are not affected by a fringe field. The pixel PX21 connected to the first sub-gate line SGL1 is also not directly adjacent to the gate lines, and thus is not affected by a fringe field.

The kickback voltage of the pixels PX22 and PX23 connected to the first sub-gate line SGL1 decreases when a fifth gate signal G5 transitions from the low level to the high level after the first gate signal G1 transitions to the low level, and increases when the fifth gate signal G5 transitions from the high level to the low level, and thus a small kickback voltage results for the pixels PX22 and PX23. The pixels PX24 and PX25 connected to the first sub-gate line SGL1 are not directly adjacent to the gate lines, and thus are not affected by a fringe field.

Also, the kickback voltages of pixels connected to a second sub-gate line SGL2 in a second row and adjacent from the second gate line GL2 to the fifth gate line GL5 are greater than the kickback voltages of remaining pixels. This difference in kickback voltage may cause non-uniformity of an image displayed on the display panel DP2.

In an example embodiment of the present disclosure, each of the first pixels PXa may be a pixel adjacent to a gate line of the gate lines and affected by a kickback voltage caused by a gate signal transmitted through the adjacent gate line. Each of the second pixels PXb may be a pixel not adjacent to the gate lines, or a pixel that is disposed adjacent to a gate line of the gate lines but is not affected by a kickback voltage caused by a gate signal transmitted through the adjacent gate line. "A pixel not adjacent to a gate line" refers to a pixel that is not directly adjacent to the gate line, is spaced apart from the gate line with another pixel (e.g., a corresponding one of the first pixels PXa) interposed therebetween, and thus is not affected by a fringe field.

A second gate-drain capacitance Cgd2 of each of the second pixels PXb is designed to be greater than a first gate-drain capacitance Cgd1 of each of the first pixels PXa. A rise in the second gate-drain capacitance Cgd2 of each of the second pixels PXb increases the kickback voltage of each of the second pixels PXb. Accordingly, the kickback voltage of each of the second pixels PXb becomes the same as the kickback voltage of each of the first pixels PXa. As a result, degradation in display quality due to a difference in kickback voltage between the first pixels PXa and the second pixels PXb may be prevented. A scheme for increasing the second gate-drain capacitance Cgd2 of each of the second pixels PXb will be described in detail later.

Figure 9:
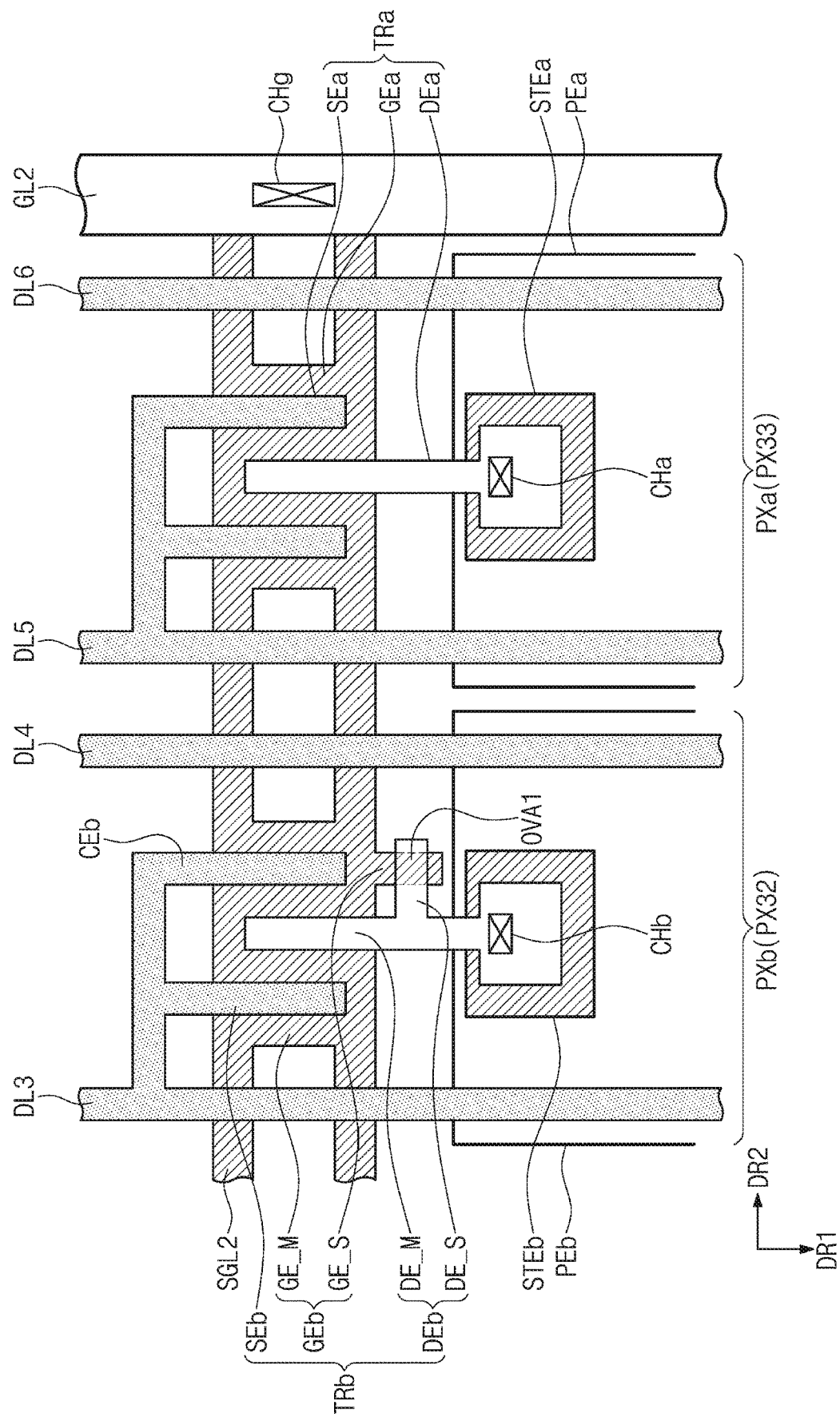
FIG. 9 is a plan view of a first pixel and a second pixel according to an example embodiment of the present disclosure.

FIG. 9 is a plan view of the first pixel PXa and the second pixel PXb according to an example embodiment of the present disclosure. FIG. 9 illustrates and describes a first pixel PX33 and a second pixel PX32 illustrated in FIG. 8 as examples of the first pixel PXa and the second pixel PXb. Other first pixels and second pixels illustrated in FIG. 8 may be respectively formed in the same structures as the first and second pixels PX33 and PX32 illustrated in FIG. 9.

The first pixel PXa illustrated in FIG. 9 is the pixel PX33 adjacent to one of the gate lines and the second pixel PXb is the pixel PX32 not adjacent to the gate lines, but an embodiment of the present disclosure is not limited. As described with reference to FIG. 8, the first pixel PXa may be any one of pixels that are each disposed adjacent to a corresponding one of the gate lines and each affected by a kickback voltage caused by a gate signal transmitted through the corresponding adjacent gate line. The second pixel PXb may be any one of pixels not adjacent to the gate lines. In addition, the second pixel PXb may be any one of pixels that are each disposed adjacent to a corresponding one of the gate lines but each are not affected by a kickback voltage caused by a gate signal transmitted through the corresponding adjacent gate line.

The first pixel PXa is connected to a fifth data line DL5 and the second sub-gate line SGL2. A sixth data line DL6 may be disposed adjacent to the fifth data line DL5 in the second direction DR2, with the first pixel PXa interposed therebetween. The first pixel PXa is not connected to the sixth data line DL6.

The first pixel PXa includes a first pixel transistor TRa, a first storage electrode STEa, and a first pixel electrode PEa. The first pixel transistor TRa includes a first source electrode SEa, a first drain electrode DEa, and a first gate electrode GEa. The first gate electrode GEa may be electrically connected to the gate line GL2 through a gate contact hole CHg. The first drain electrode DEa may be disposed to be spaced apart from the first source electrode SEa on the first gate electrode GEa.

The first drain electrode DEa is electrically connected to the first pixel electrode PEa through a drain contact hole CHa. Accordingly, when turned on in response to the gate signal applied from the second sub-gate line SGL2, the first pixel transistor TRa may output, to the first drain electrode DEa, a data signal applied from the fifth data line DL5. The data signal outputted through the first drain electrode DEa is applied to the first pixel electrode PEa. A portion of the first drain electrode DEa overlaps the first storage electrode STEa and the first pixel electrode PEa.

Although the first storage electrode STEa and the first pixel electrode PEa are each illustrated as having a quadrangular shape in FIG. 9, the shapes of the first storage electrode STEa and the first pixel electrode PEa are not limited. For example, the first storage electrode STEa may have a polygonal shape. The first pixel electrode PEa may include a plurality of fine slits spaced a few micrometers (μm) apart from each other. Liquid crystal molecules of the liquid crystal layer LCL (shown in FIG. 3) may be pre-tilted by the fine slits in different directions for each domain.

The second pixel PXb is connected to a third data line DL3 and the second sub-gate line SGL2. A fourth data line DL4 may be disposed adjacent to the third data line DL3 in the second direction DR2, with the second pixel PXb interposed therebetween. The second pixel PXb is not connected to the fourth data line DL4.

The second pixel PXb includes a second pixel transistor TRb, a second storage electrode STEb, and a second pixel electrode PEb. The second pixel transistor TRb includes a second source electrode SEb, a second drain electrode DEb, and a second gate electrode GEb. The second gate electrode GEb may be electrically connected to the gate line GL2 through the gate contact hole CHg. The first gate electrode GEa of the first pixel transistor TRa and the second gate electrode GEb of the second pixel transistor TRb may be a part of the second sub-gate line SGL2 extending in the second direction DR2. The second sub-gate line SGL2 is electrically connected to the gate line GL2 through the gate contact hole CHg. The second drain electrode DEb may be disposed to be spaced apart from the second source electrode SEb on the second gate electrode GEb.

The second drain electrode DEb is electrically connected to the second pixel electrode PEb through a drain contact hole CHb. Accordingly, when turned on in response to the gate signal applied from the second sub-gate line SGL2, the second pixel transistor TRb may output, to the second drain electrode DEb, a data signal applied from the third data line DL3. The data signal outputted through the second drain electrode DEb is applied to the second pixel electrode PEb. A portion of the second drain electrode DEb overlaps the second storage electrode STEb and the second pixel electrode PEb.

Although the second storage electrode STEb and the second pixel electrode PEb are each illustrated as having a quadrangular shape in FIG. 9, the shapes of the second storage electrode STEb and the second pixel electrode PEb are not limited. For example, the second storage electrode STEb may have a polygonal shape. The second pixel electrode PEb may include a plurality of fine slits spaced a few micrometers (μm) apart from each other. Liquid crystal molecules of the liquid crystal layer LCL (shown in FIG. 3) may be pre-tilted by the fine slits in different directions for each domain.

The second gate electrode GEb includes a main gate electrode GE_M and a sub-gate electrode GE_S. The second drain electrode DEb includes a main drain electrode DE_M and a sub-drain electrode DE_S.

The main gate electrode GE_M overlaps the second source electrode SEb and the main drain electrode DEM of the second drain electrode DEb. The sub-gate electrode GE_S has a rectangular shape protruding outwardly from the main gate electrode GE_M in the first direction DR1. That is, the sub-gate electrode GE_S is disposed parallel to the main drain electrode DE_M of the second drain electrode DEb along the first direction DR1 and is disposed perpendicular to the sub-drain electrode DE_S of the second drain electrode DEb. Furthermore, the sub-gate electrode GE_S is aligned in parallel to data lines DL3, DL4, DL5, and DL6 and the second gate line GL2 along the first direction DR1.

The sub-drain electrode DE_S of the second drain electrode DEb has a rectangular shape protruding outwardly from the main drain electrode DE_M in the second direction DR2. A portion of the sub-gate electrode GE_S and a portion of the sub-drain electrode DE_S overlap each other to form an overlap area OVA1 when viewed in a plane. Capacitance formed by the overlap area OVA1 between the sub-gate electrode GE_S and the sub-drain electrode DE_S may increase the second gate-drain capacitance Cgd2 between the second gate electrode GEb and the second drain electrode DEb. When viewed in a plane, the sub-drain electrode DE_S does not overlap the main gate electrode GE_M, and the sub-gate electrode GE_S does not overlap the main drain electrode DE_M.

As illustrated in FIG. 9, the first pixel electrode PEa of the first pixel PXa is disposed adjacent to the second gate line GL2. Accordingly, the kickback voltage of the first pixel PXa is greater than the kickback voltage of the second pixel PXb due to the effect of a fringe field. The kickback voltage of the second pixel PXb may be equal to the kickback voltage of the first pixel PXa by designing such that the second gate-drain capacitance Cgd2 of the second pixel PXb is greater than the first gate-drain capacitance Cgd1 of the first pixel PXa. As a result, degradation in display quality due to a difference in kickback voltage between the first pixel PXa and the second pixel PXb may be prevented.

The surface area of the overlap area OVA1 between the sub-gate electrode GE_S and the sub-drain electrode DE_S may be determined depending on second gate-drain capacitance Cgd2 of the second pixel PXb capable of compensating for the difference between the kickback voltage of the first pixel PXa and the kickback voltage of the second pixel PXb.

Figure 10:
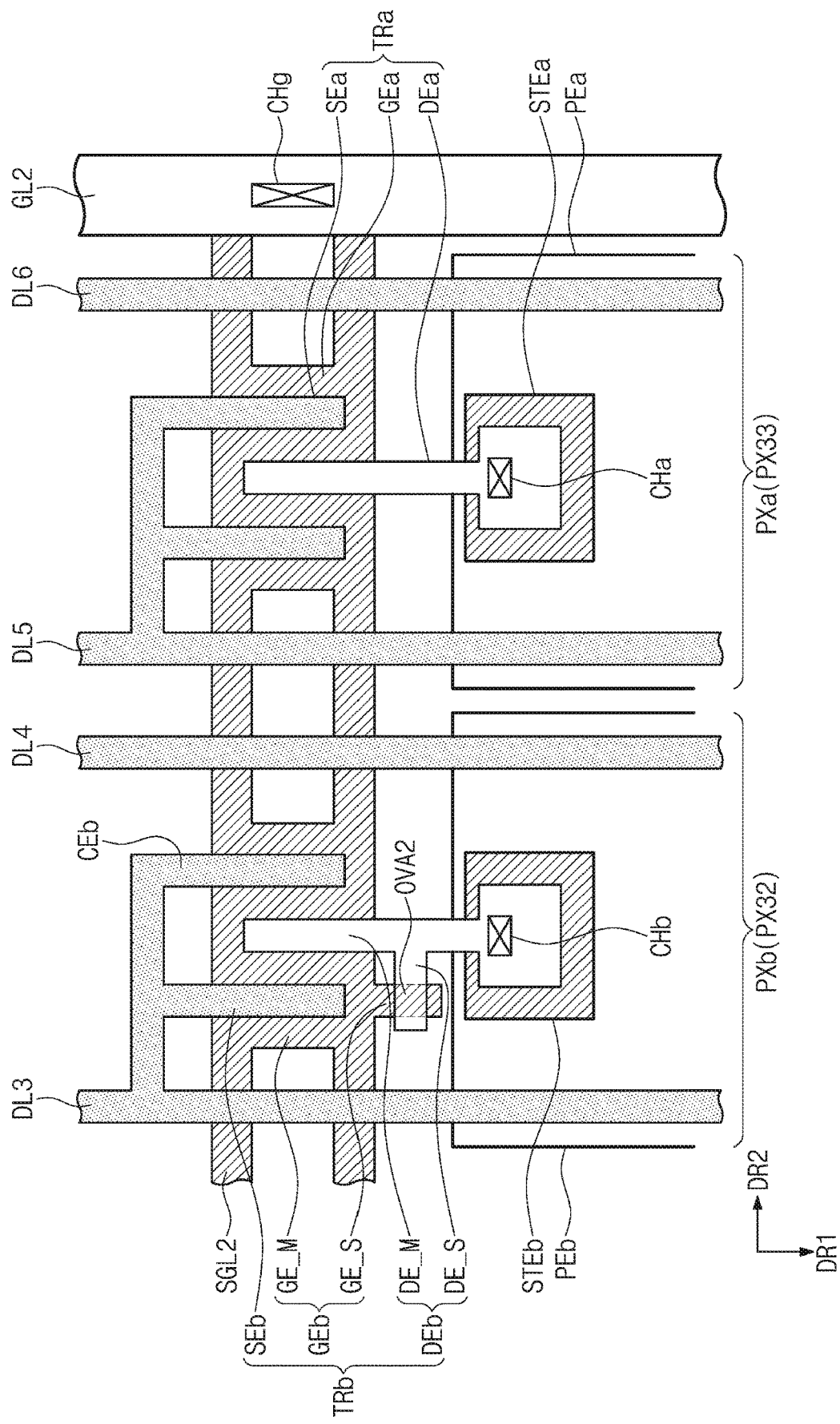
FIG. 10 is a plan view of a first pixel and a second pixel according to an example embodiment of the present disclosure.

FIG. 10 is a plan view of the first pixel PXa and a second pixel PXb according to an example embodiment of the present disclosure. Because the first pixel PXa and the second pixel PXb illustrated in FIG. 10 are substantially equal to the first pixel PXa and the second pixel PXb illustrated in FIG. 9, a duplicate description will be omitted.

Referring to FIG. 10, a second gate electrode GEb includes the main gate electrode GE_M and a sub-gate electrode GE_S. A second drain electrode DEb includes the main drain electrode DE_M and a sub-drain electrode DE_S.

The main gate electrode GE_M overlaps the second source electrode SEb and the main drain electrode DEM of the second drain electrode DEb. The sub-gate electrode GE_S has a rectangular shape protruding outwardly from the main gate electrode GE_M in the first direction DR1. That is, the sub-gate electrode GE_S is disposed parallel to the main drain electrode DE_M of the second drain electrode DEb along the first direction DR1 and is disposed perpendicular to the sub-drain electrode DE_S of the second drain electrode DEb. Furthermore, the sub-gate electrode GE_S is aligned in parallel to data lines DL3, DL4, DL5, and DL6 and the second gate line GL2 along the first direction DR1.

The sub-drain electrode DE_S of the second drain electrode DEb has a rectangular shape protruding from the main drain electrode DE_M in a reverse direction of the second direction DR2. That is, unlike in FIG. 9, the second drain electrode DEb is facing to the third data line DL3. A portion of the sub-gate electrode GE_S and a portion of the sub-drain electrode DE_S overlap each other to form an overlap area OVA2, when viewed in a plane. Capacitance formed by the overlap area OVA2 between the sub-gate electrode GE_S and the sub-drain electrode DE_S may increase the second gate-drain capacitance Cgd2 between the second gate electrode GEb and the second drain electrode DEb.

Figure 11:
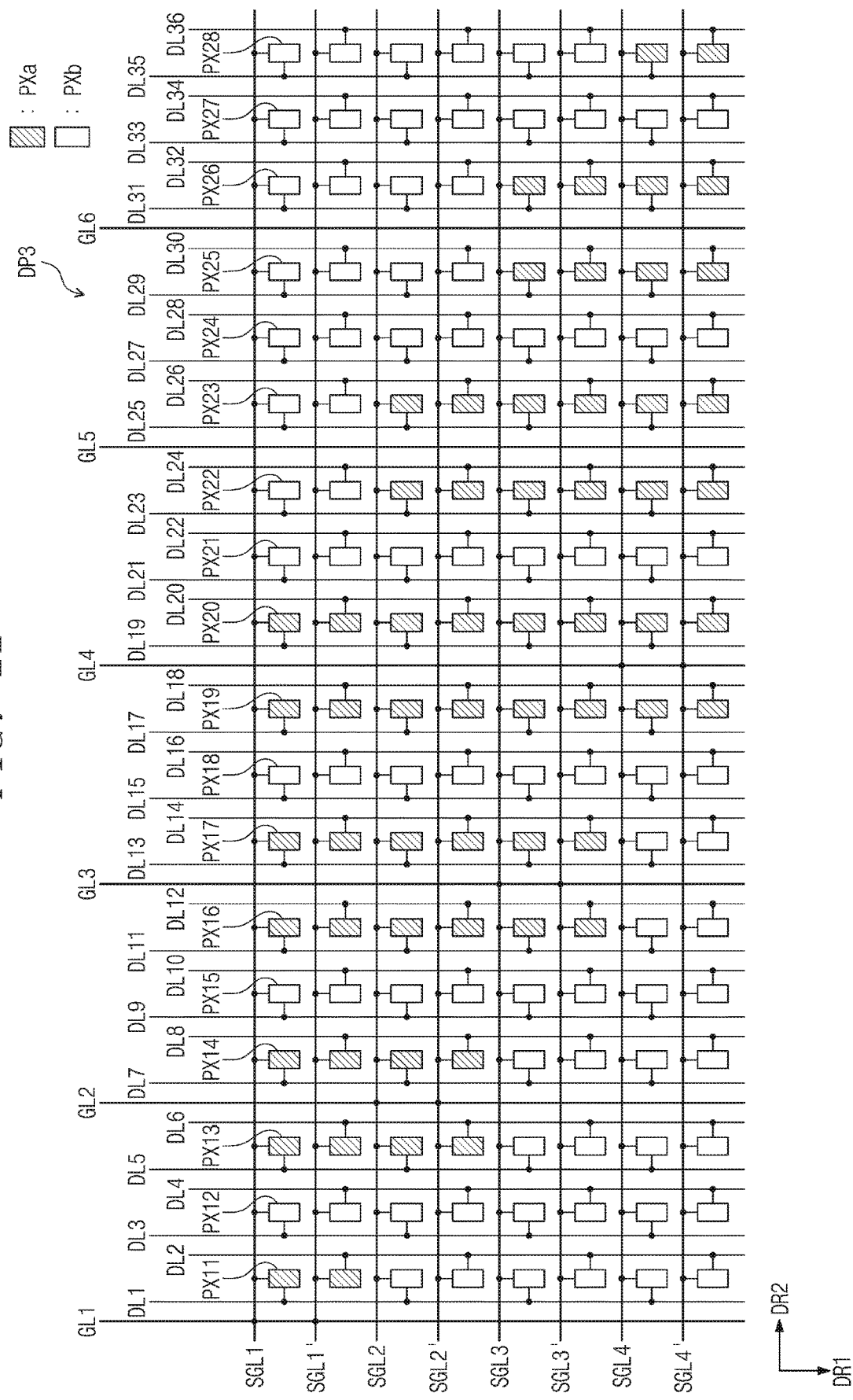
FIG. 11 illustrates a pixel arrangement of a display panel according to an example embodiment of the present disclosure.

FIG. 11 illustrates a pixel arrangement of a display panel DP3 according to an example embodiment of the present disclosure.

Referring to FIG. 11, the display panel DP3 includes gate lines from GL1 to GL6, sub-gate lines from SGL1 to SGL4 and from SGL1' to SGL4', data lines from DL1 to DL36, first pixels PXa, and second pixels PXb. The gate lines from GL1 to GL6 extend in the first direction DR1 and are sequentially arranged in the second direction DR2. The sub-gate lines from SGL1 to SGL4 and from SGL1' to SGL4' extend in the second direction DR2 and are sequentially arranged in the first direction DR1. The data lines from DL1 to DL36 extend in the first direction DR2 and are sequentially arranged in the second direction DR2. Each of the sub-gate lines from SGL1 to SGL4 and from SGL1' to SGL4' is electrically connected to a corresponding gate line among the gate lines from GL1 to GL4. The gate lines from SGL1 to SGL6 may be arranged in parallel with the data lines from DL1 to DL36.

In an embodiment illustrated in FIG. 11, two sub-gate lines are connected to one gate line. For example, the sub-gate lines SGL1 and SGL1' are connected to the gate line GL1. The sub-gate lines SGL2 and SGL2' are connected to the gate line GL2. The sub-gate lines SGL3 and SGL3' are connected to the gate line GL3. The sub-gate lines SGL4 and SGL4' are connected to the gate line GL4. Although not illustrated in the figure, the sub-gate lines SGL5 and SGL5' may be connected to the gate line GL5, and the sub-gate lines SGL6 and SGL6' may be connected to the gate line GL6.

In addition, the number of the data lines from DL1 to DL36 is greater than the number of the gate lines from GL1 to GL6 in the embodiment illustrated in FIG. 11. One gate line of the gate lines from GL1 to GL6 may be disposed for every six data lines of the data lines from DL1 to DL36. In an example embodiment, the number of the data lines DL1 to DL36 may be twice the number of first pixels PXa and second pixels PXb arranged in the same row in the second direction DR2. That is, two data lines of the data lines from DL1 to DL36 may be respectively disposed adjacent to the left and right sides of each corresponding pixel of the first pixels PXa and the second pixels PXb arranged in the same row in the second direction DR2.

Each of the first pixels PXa and the second pixels PXb may include the pixel transistor TR, the liquid crystal capacitor Clc, and the storage capacitor Cst, as illustrated in FIG. 2. Each of the first pixels PXa and the second pixels PXb is connected to a corresponding sub-gate line among the sub-gate lines from SGL1 to SGL4 and from SGL1' to SGL4', and a corresponding data line among the data lines from DL1 to DL36. The gate signals provided through the gate lines from GL1 to GL4 may be transmitted to the first pixels PXa and the second pixels PXb through the sub-gate lines from SGL1 to SGL4 and from SGL1' to SGL4' respectively.

In the example illustrated in FIG. 11, two rows are connected to the same gate line through two sub-gate lines. For example, first pixels PXa and second pixels PXb connected to the sub-gate lines SGL1 and SGL1' receive the same gate signal provided through the gate line GL1.

In an example embodiment, first pixels PXa and second pixels PXb in an (2i−1)-th row (i.e., an odd-numbered row) are connected to a sub-gate line SGLi connected to an i-th gate line GLi. First pixels PXa and second pixels PXb in a 2i-th row (i.e., an even-numbered row) are connected to a sub-gate line SGLi' connected to the i-th gate line GLi. The first pixels PXa in the (2i−1)-th row are pixels disposed adjacent from the i-th gate line GLi to an (i+k)-th gate line GLi+k (i and k are each a natural number). The second pixels PXb are pixels other than the first pixels PXa. When the gate signals from G1 to G6 are sequentially activated every horizontal period 1H and each of the gate signals from G1 to G6 is maintained at the active level for the four horizontal periods 4H, k may be equal to 3.

First pixels PXa and/or second pixels PXb arranged in the same row in the second direction DR2 are connected to the same sub-gate line. First pixels PXa and/or second pixels PXb arranged in the same column in the first direction DR1 may be alternately connected to a data line adjacent to the left side thereof and a data line adjacent to the right side thereof. In the example illustrated in FIG. 11, first pixels PXa and/or second pixels PXb arranged in the same column in the first direction DR1 are alternately connected one by one to a data line adjacent to the left side thereof and a data line adjacent to the right side thereof. In a predetermined frame, for example, the odd-numbered data lines from DL1 to DL35 may be driven with data signals of positive polarity, and the even-numbered data lines from DL2 to DL36 may be driven with data signals of negative polarity.

As previously described with reference to FIGS. 6 and 7, when the gate signals from G1 to G6 are sequentially activated every horizontal period 1H and each of the gate signals from G1 to G6 is maintained at the active level for the four horizontal periods 4H, the kickback voltage of first pixels PXa disposed adjacent from the i-th gate line to the (i+3)-th gate line in the (2i−1)-th row is greater than the kickback voltage of second pixels PXb in the (2i−1)-th row.

For example, the kickback voltage of each of the seven pixels PX11, PX13, PX14, PX16, PX17, PX19, and PX20 connected to a first sub-gate line SGL1 of a first row is greater than the kickback voltage of each of the pixels PX12, PX15, PX18, and PX21 to PX28. Because each of the pixels PX11, PX13, PX14, PX16, PX17, PX19, and PX20 is adjacent to a corresponding one of the gate lines from GL1 to GL4, the kickback voltage adjacent to the gate lines from GL1 to GL4 may increase due to the effect of a fringe field.

The pixel PX12 disposed between the pixels PX11 and PX13, the pixel PX15 disposed between the pixels PX14 and PX16, and the pixel PX18 disposed between the pixels PX17 and PX19 are not disposed directly adjacent to the corresponding gate lines, and thus are not affected by a fringe field. The pixel PX21 connected to the first sub-gate line SGL1 is also not directly adjacent to gate lines, and thus is not affected by a fringe field.

The kickback voltage of the pixels PX22 and PX23 connected to the sub-gate line SGL1 decreases when the fifth gate signal G5 transitions from the low level to the high level after the first gate signal G1 transitions to the low level, and increases when the fifth gate signal G5 transitions from the high level to the low level, and thus a small kickback voltage results for the pixels PX22 and PX23. The pixels PX24 and PX27 connected to the first sub-gate line SGL1 are not directly adjacent to the gate lines, and thus are not affected by a fringe field.

Pixels connected to the sub-gate line SGL1' receive, through the gate line GL1, a gate signal the same as that received from the sub-gate line SGL1. Accordingly, the arrangement order of first pixels PXa and second pixels PXb of two rows adjacent in the first direction DR1 may be the same.

The first pixels PXa and the second pixels PXb illustrated in FIG. 11 may have shapes the same as the shapes of the first pixel PXa and the second pixel PXb illustrated in FIGS. 9 and 10. Accordingly, the kickback voltage of the second pixels PXb may be equal to the kickback voltage of the first pixels PXa by designing such that a second gate-drain capacitance Cgd2 of the second pixels PXb is greater than a first gate-drain capacitance Cgd1 of the first pixels PXa. As a result, degradation in display quality due to a difference in kickback voltage between the first pixels PXa and the second pixels PXb may be prevented.

Figure 12:
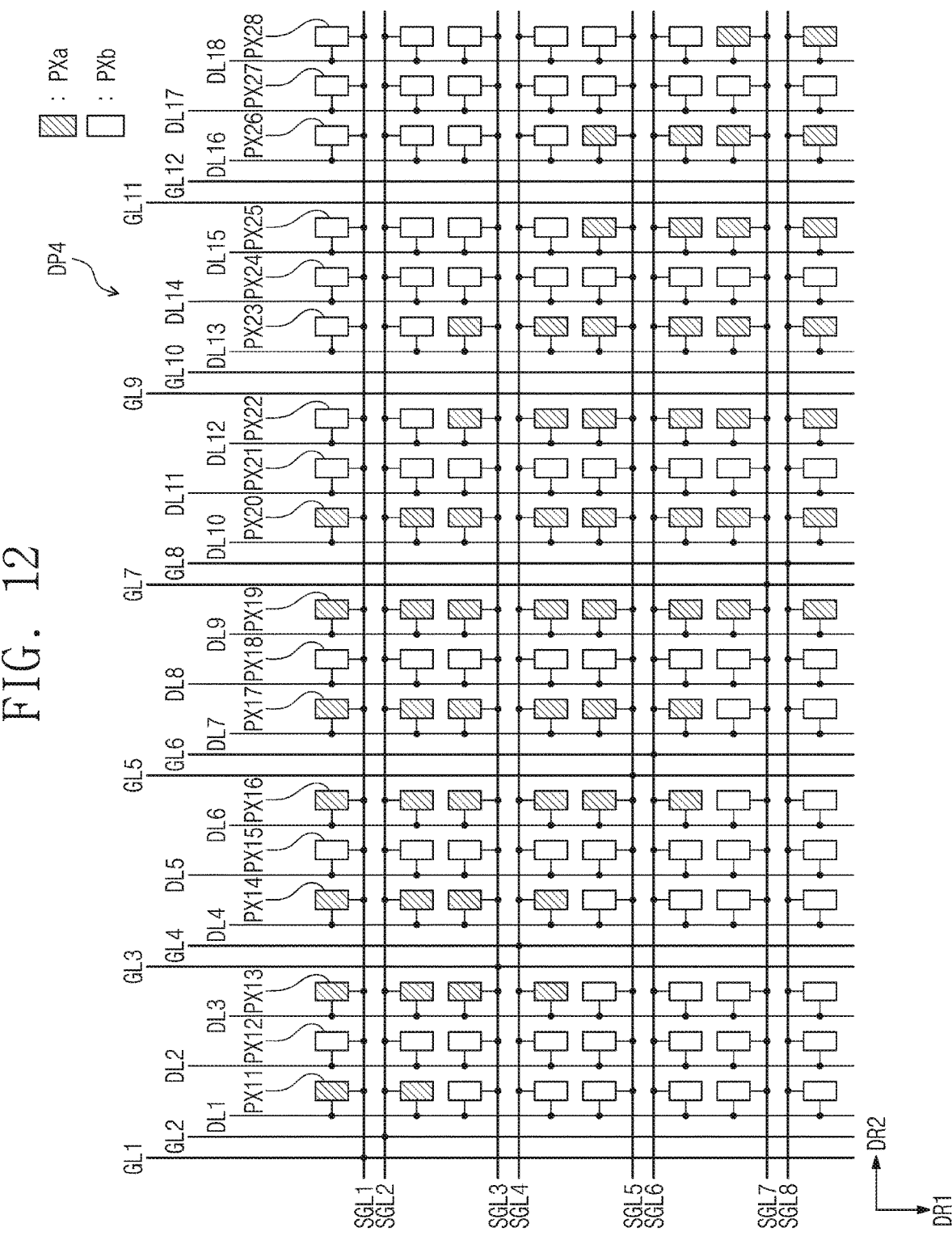
FIG. 12 illustrates a pixel arrangement of a display panel according to an example embodiment of the present disclosure.

FIG. 12 illustrates a pixel arrangement of a display panel DP4 according to an example embodiment of the present disclosure.

Referring to FIG. 12, the display panel DP4 includes gate lines from GL1 to GL12, sub-gate lines from SGL1 to SGL8, data lines from DL1 to DL18, first pixels PXa, and second pixels PXb. The gate lines from GL1 to GL12 extend in the first direction DR1 and are sequentially arranged in the second direction DR2. The sub-gate lines from SGL1 to SGL8 extend in the second direction DR2 and are sequentially arranged in the first direction DR1. The data lines from DL1 to DL18 extend in the first direction DR2 and are sequentially arranged in the second direction DR2. Each of the sub-gate lines from SGL1 to SGL8 is electrically connected to a corresponding gate line among the gate lines from GL1 to GL8. The gate lines from GL1 to GL12 may be arranged in parallel with the data lines from DL1 to DL18.

In an embodiment illustrated in FIG. 12, the number of the data lines from DL1 to DL18 is greater than the number of the gate lines from GL1 to GL12. Two gate lines of the gate lines from GL1 to GL12 may be disposed for every three data lines of the data lines from DL1 to DL18. In an example embodiment, the number of the data lines from DL1 to DL18 may be equal to the number of first pixels PXa and second pixels PXb arranged in the same row in the second direction DR2. For example, each of the first pixels PXa and the second pixels PXb may be connected to a data line which is adjacent to the left side of the first pixels PXa and second pixels PXb.

Each of the first pixels PXa and the second pixels PXb may include the pixel transistor TR, the liquid crystal capacitor Clc, and the storage capacitor Cst, as illustrated in FIG. 2. Each of the first pixels PXa and the second pixels PXb is connected to a corresponding sub-gate line among the sub-gate lines from SGL1 to SGL6 and a corresponding data line among the data lines from DL1 to DL18. The gate signals provided through the gate lines from GL1 to GL6 may be transmitted to the first pixels PXa and the second pixels PXb through the sub-gate lines from SGL1 to SGL6 respectively.

In an example embodiment, first pixels PXa and second pixels PXb in an i-th row are connected to an i-th sub-gate line SGLi connected to an i-th gate line GLi. The first pixels PXa in the i-th row are pixels disposed adjacent to from the i-th gate line GLi to an (i+k)-th gate line GLi+k (i and k are each a natural number). The second pixels PXb are pixels other than the first pixels PXa. When the gate signals from G1 to G6 respectively provided to the gate lines from GL1 to GL6 are sequentially activated every horizontal period 1H, and each of the gate signals from G1 to G6 is maintained at the active level for the four horizontal periods 4H, k may be equal to 3.

As previously described with reference to FIGS. 6 and 7, when the gate signals from G1 to G11 respectively provided to the gate lines from GL1 to GL11 are sequentially activated every horizontal period 1H and each of the gate signals from G1 to G11 is maintained at the active level for eight horizontal periods 8H, the kickback voltage of first pixels PXa disposed adjacent to from an i-th gate line to an (i+7)-th gate line in an i-th row is greater than the kickback voltage of second pixels PXb in the i-th row. For example, a kickback voltage of each of the seven pixels PX11, PX13, PX14, PX16, PX17, PX19, and PX20 connected to a first sub-gate line SGL1 of a first row is greater than a kickback voltage of each of the pixels PX12, PX15, PX18, and PX21 to PX28. Because each of the pixels PX11, PX13, PX14, PX16, PX17, PX19, and PX20 is adjacent to a corresponding one of the gate lines from GL2 to GL8, the kickback voltage may increase due to the effect of a fringe field.

The pixel PX12 disposed between the pixels PX11 and PX13, the pixel PX15 disposed between the pixels PX14 and PX16, and the pixel PX18 disposed between the pixels PX17 and PX19 are not disposed directly adjacent to the corresponding gate lines, and thus are not affected by a fringe field. The pixels PX21 and PX28 connected to sub-gate line SGL1 are not affected by the kickback voltage and the fringe field.

The first pixels PXa and the second pixels PXb illustrated in FIG. 12 may have shapes equal to the shapes of the first pixel PXa and the second pixel PXb illustrated in FIGS. 9 and 10. Accordingly, the kickback voltage of the second pixels PXb may be equal to the kickback voltage of the first pixels PXa by designing such that a second gate-drain capacitance Cgd2 of the second pixels PXb is greater than a first gate-drain capacitance Cgd1 of the first pixels PXa. As a result, degradation in display quality due to a difference in kickback voltage between the first pixels PXa and the second pixels PXb may be prevented.

A display device having such a configuration may minimize the bezel area of the display device by disposing the driving circuit for driving the gate lines and the data lines on one side of the display panel. In addition, the display device includes, in specific pixels, a compensation pattern for compensating for a difference in charging rate between pixels. Accordingly, degradation of display quality due to the difference in charging rate between the pixels may be prevented.

Although the example embodiments of the present disclosure have been described herein, it is understood that various changes and modifications can be made by those skilled in the art within the spirit and scope of the present disclosure defined by the following claims or the equivalents.

Therefore, the example embodiments described herein are not intended to limit the technical spirit and scope of the present disclosure, and all technical spirit within the scope of the following claims or the equivalents will be construed as being included in the scope of the present disclosure.

What is claimed is:
1. A display device comprising:
a display panel including gate lines each of which is extending in a first direction, sub-gate lines each of which is extending in a second direction substantially perpendicular to the first direction and electrically connected to each of the corresponding gate lines, first data lines each of which is extending in the first direction, second data lines each of which is extending in the first direction, first pixels each of which is connected to one of the sub-gate lines and one of the first data lines, and second pixels each of which is connected to one of the sub-gate lines and one of the second data lines; and
a driving circuit configured to provide a gate signal to the gate line and provide data signals to one of the first data lines and one of the second data lines,
wherein the one of first pixels includes a first source electrode connected to one of the first data lines, a first drain electrode connected to a common electrode, and a first gate electrode connected to one of the sub-gate lines,
one of the second pixels includes a second source electrode connected to one of the second data lines, a second drain electrode connected to the common electrode, and a second gate electrode connected to one of the sub-gate lines,
a second capacitance disposed between the second drain electrode and the second gate electrode of one of the second pixels is greater than a first capacitance disposed between the first drain electrode and the first gate electrode of one of first pixels, and
the second drain electrode of the second pixel includes a main drain electrode and a sub-drain electrode protruding outwardly from the main drain electrode along the second direction,
the second gate electrode of the second pixel includes a main gate electrode and a sub-gate electrode protruding outwardly from the main gate electrode along the first direction, and
a portion of the sub-drain electrode and a portion of the sub-gate electrode overlap each other to form an overlapped area in a plan view.
2. The display device of claim 1, wherein a surface area of an overlapped area between the second drain electrode and the second gate electrode of the second pixel is greater than a surface area of an overlapped area between the first drain electrode and the first gate electrode of the first pixel.

3. The display device of claim 1, wherein
the main drain electrode is disposed to be spaced apart from the second source electrode,
the main gate electrode overlaps the second source electrode and the main drain electrode, and
the overlapped area has a rectangular shape.

4. The display device of claim 3, wherein the sub-drain electrode does not overlap the main gate electrode.

5. The display device of claim 3, wherein the sub-gate electrode does not overlap the main drain electrode.

6. The display device of claim 1, wherein a number of the gate lines is equal to a number of the first and second data lines.

7. The display device of claim 1, wherein
the first pixel and the second pixel are disposed adjacent to each other in the second direction, and
the first pixel is disposed adjacent to the gate line, and the second pixel is spaced apart from the gate line with the first pixel interposed between the second pixel and the gate line.

8. The display device of claim 7, wherein a number of the first and second data lines is greater than a number of the gate lines.

9. The display device of claim 1, wherein the driving circuit includes:
a flexible circuit board connected to one side of the display panel; and
a driving chip mounted on the flexible circuit board and configured to provide the gate signal and each of the data signals.

10. A display device comprising:
a display panel including a plurality of gate lines extending in a first direction, a plurality of sub-gate lines extending in a second direction substantially perpendicular to the first direction and electrically connected to the plurality of gate lines respectively, a plurality of data lines extending in the first direction, and a plurality of first pixels and a plurality of second pixels which are each connected to a corresponding sub-gate line of the plurality of sub-gate lines and a corresponding data line of the plurality of data lines; and
a driving circuit configured to provide a plurality of gate signals to the plurality of gate lines respectively, and provide a plurality of data signals to the plurality of data lines respectively,
wherein first pixels, which correspond to an i-th sub-gate line among the plurality of sub-gate lines, among the plurality of first pixels are connected to the i-th sub-gate line, and disposed adjacent from i-th to (i+k)-th (i and k are each a natural number) gate lines among the plurality of gate lines,
each of the plurality of first pixels includes a first source electrode connected to a corresponding data line among the data lines, a first drain electrode connected to a common electrode, and a first gate electrode connected to a corresponding sub-gate line among the sub-gate lines,
each of the plurality of the second pixels includes a second source electrode connected to a corresponding data line among the data lines, a second drain electrode connected to the common electrode, and a second gate electrode connected to a corresponding sub-gate line among the sub-gate lines,
a second capacitance disposed between the second drain electrode and the second gate electrode of each of the plurality of second pixels is greater than a first capacitance disposed between the first drain electrode and the first gate electrode of each of the plurality of first pixels,
the second drain electrode of the second pixel includes a main drain electrode and a sub-drain electrode protruding outwardly from the main drain electrode along the second direction,
the second gate electrode of the second pixel includes a main gate electrode and a sub-gate electrode protruding outwardly from the main gate electrode along the first direction, and
a portion of the sub-drain electrode and a portion of the sub-gate electrode overlap each other to form an overlapped area in a plan view.

11. The display device of claim 10, wherein a surface area of an overlapped area between the second drain electrode and the second gate electrode of each of the plurality of second pixels is greater than a surface area of an overlapped area between the first drain electrode and the first gate electrode of each of the first pixels.

12. The display device of claim 10, wherein
the main drain electrode is disposed to be spaced apart from the second source,
the main gate electrode overlaps the second source electrode and the main drain electrode, and
the overlapped area has a rectangular shape.

13. The display device of claim 12, wherein the sub-drain electrode does not overlap the main gate electrode.

14. The display device of claim 12, wherein the sub-gate electrode does not overlap the main drain electrode.

15. The display device of claim 10, wherein the plurality of gate signals respectively provided to the plurality of gate lines are sequentially activated at an active level every horizontal period, and are respectively maintained at the active level for (k+1) number of horizontal periods.

16. The display device of claim 10, wherein
odd-numbered data lines among the plurality of data lines are respectively disposed on left sides of pixel columns formed by the plurality of first pixels and the plurality of second pixels,
even-numbered data lines among the plurality of data lines are respectively disposed on right sides of the pixel columns formed by the plurality of first pixels and the plurality of second pixels, and
each of the plurality of first pixels and the plurality of second pixels is connected to any one of the odd-numbered data lines and the even-numbered data lines.

17. The display device of claim 16, wherein
the odd-numbered data lines among the plurality of data lines alternately transmit data signals of positive polarity and data signals of negative polarity every frame, and
the even-numbered data lines among the plurality of data lines alternately transmit data signals of the negative polarity and data signals of the positive polarity every frame.

18. The display device of claim 16, wherein the plurality of the first pixels and the plurality of the second pixels arranged in the same column in the first direction are alternately connected to corresponding odd-numbered data lines which are disposed on the left of the plurality of the first pixels and the plurality of the second pixels and to corresponding even-numbered data lines which are disposed on the right of the plurality of the first pixels and the plurality of the second pixels.

19. The display device of claim 10, wherein the driving circuit includes:
- a flexible circuit board connected to one side of the display panel; and
- a driving chip mounted on the flexible circuit board and configured to provide the plurality of gate signals and the plurality of data signals.

20. The display device of claim 10, wherein the display panel further includes:
- a first substrate;
- a second substrate facing the first substrate; and
- a liquid crystal layer disposed between the first substrate and the second substrate,
- wherein the plurality of gate lines, the plurality of sub-gate lines, the plurality of data lines, the plurality of first pixels, and the plurality of second pixels are arranged on the first substrate.

* * * * *